United States Patent [19]
Hamagishi

[11] Patent Number: 6,049,424
[45] Date of Patent: Apr. 11, 2000

[54] THREE DIMENSIONAL DISPLAY DEVICE

[75] Inventor: Goro Hamagishi, Osaka, Japan

[73] Assignee: Sanyo Electric Co., Ltd., Osaka, Japan

[21] Appl. No.: 08/748,778

[22] Filed: Nov. 14, 1996

[30] Foreign Application Priority Data

Nov. 15, 1995 [JP] Japan ..................................... 7-297068
Oct. 21, 1996 [JP] Japan ..................................... 8-278468

[51] Int. Cl.[7] .............................. G02B 27/22; H04N 9/47; H04N 13/04; H04N 15/00
[52] U.S. Cl. .......................... 359/464; 359/462; 359/463; 348/56; 348/55; 348/54; 348/51; 345/139; 349/15
[58] Field of Search ...................................... 359/462, 463, 359/464; 348/51, 54, 55, 56; 349/15; 345/139

[56] References Cited

U.S. PATENT DOCUMENTS 5,315,377  5/1994  Isono et al. ................................. 348/51

*Primary Examiner*—Cassandra Spyrou
*Assistant Examiner*—Audrey Chang
*Attorney, Agent, or Firm*—Nikaido, Marmelstein, Murray & Oram LLP

[57] ABSTRACT

The present invention is directed to a three-dimensional display device so adapted that an uncomfortable feeding in a case where a right eye image and a left eye image on a screen are replaced with each other in correspondence to the position of the head of a viewer can be eliminated, to laterally move the position of a shading barrier to laterally move a normal view position or a reversed view position upon selectively turning liquid crystal shutters provided in both ends in the lateral direction of a slit of the shading barrier on and off by barrier movement means when the head of the viewer is in a moire position between the normal view position and the reversed view position.

25 Claims, 25 Drawing Sheets

THREE DIMENSIONAL DISPLAY DEVICE

BACKGROUND OF THE INVENTION

1. Field of the Invention

The present invention relates to a three-dimensional (3D) display device capable of viewing three-dimensional images without using special glasses, and more particularly, to a three-dimensional display device so adapted that an uncomfortable feeling in replacing a right eye image and a left eye image on a screen in correspondence to the position of the head of a viewer can be eliminated.

2. Description of the Prior Art

Conventional examples of a device for displaying 3D images without using special glasses include one so adapted that a parallax barrier or a lenticulated lens is arranged on the side of a viewer on a display screen of a display panel such as a liquid crystal display (LCD) panel, so that a 3D image can be viewed by separating light from a right eye image and light from a left eye image which are alternately displayed for each vertical line on the display screen from each other.

There is also a device for displaying a 3D image without using special glasses by separate incidence of light for left eye and light for right eye on a display panel of a transmission type such as an LCD panel.

In the above-mentioned 3D display device, an optimum viewing position is set, as shown in FIG. 26. That is, the optimum viewing position on which a right eye image and a left eye image are converged is set to a position spaced an optimum viewing distance D apart from a 3D display device 200. In the optimum viewing distance D and predetermined ranges ahead of and behind the distance D, diamond-shaped regions R where the right eye image can be viewed and diamond-shaped regions L where the left eye image can be viewed alternately exist for each distance between the eyes E of a viewer 2 as shown in FIG. 27. In a position a where the right eye 2R and the left eye 2L of the viewer 2 respectively exist in the region R and the region L, normal 3D images can be viewed. This is equivalent to the case where the center of both eyes of a viewer exist in the position shown in diamond-shaped region a of FIG. 26. On the contrary, in a position b where the right eye 2R and the left eye 2L of the viewer 2 respectively exist in the region L and the region R, no 3D images can be viewed due to reversed view. This is equivalent to the case where the center of both eyes of a viewer exist in the position shown in diamond-shaped region b of FIG. 26.

In order to enlarge a region where 3D images can be viewed, therefore, a 3D display device 200, which is provided with a sensor 201 for sensing the position of the head of the viewer 2, and image replacement means for replacing a right eye image and a left eye image on a display panel of the 3D display device 200 when the sensor 201 senses that the head of the viewer 2 is in a reversed view position, as shown in FIGS. 27 and 28, for example, has been proposed (see, Japanese Patent Application No. 7-253888, for example).

This is equivalent to the case where the center of both eyes of a viewer exist in the position shown in diamond-shaped region a of FIG. 26. FIG. 27 illustrates a state where the head of the viewer 2 is in a position where normal 3D images can be viewed. The right eye 2R is positioned in a region R where a right eye image can be viewed, and the left eye 2L is positioned in a region L where a left eye image can be viewed. FIG. 28 illustrates a state where the head of the viewer 2 is in a position where no 3D images can be viewed due to reversed view in the conventional example. This is equivalent to the case where the center of both eyes of a viewer exist in the position shown in diamond-shaped region b of FIG. 26. As shown in FIG. 28. A right eye image and a left eye image on the display panel of the 3D display device 200 are replaced with each other, whereby the region R where the right eye 2R can view the right eye image and the region L where the right eye 2R can view the left eye image are replaced with each other. As a result, the right eye 2R is positioned in the region R where the right eye image can be viewed and the left eye 2L is positioned in the region L where the left eye image can be viewed, so that normal 3D images can be viewed.

As described in the foregoing, in the 3D display device 200 so adapted that the right eye image and the left eye image which are displayed on the display panel are replaced with each other, when the eyes of the viewer are shifted to a reversed view position, it is possible for the viewer to view proper images by replacing the right and left images. However, a crosstalk region or a black region exists between the region R where the right eye image can be viewed and the region L where the left eye image can be viewed, as shown in FIG. 29, until the eyes of the viewer 2 are moved from the normal view position to the reversed view position. The crosstalk region or the black region reaches the eyes of the viewer 2 while the right eye image and the left type image are replaced with each other, whereby the viewer 2 views a blurred double-image or a moire-shaped image and has an uncomfortable feeling in a position where the crosstalk region or the black region reaches the eyes of the viewer 2. In the present invention, the position where the crosstalk region or the black region reaches the eyes of the viewer 2 so that the viewer 2 views a blurred image or a moire-shaped image is generically named a moire position. A moire region mainly exist in the position spaced approximately one half of the distance between the eyes of the viewer apart from the center of the normal view position. This is the position that the head of the viewer is in when the viewer's head is spaced approximately one-fourth to approximately three-fourths of the distance between the eyes of the viewer apart from the center of the normal view position.

SUMMARY OF THE INVENTION

An object of the present invention is to provide a 3D display device so adapted that an uncomfortable feeding in replacing a right eye image and a left eye image on a screen in correspondence to the position of the head of a viewer can be eliminated.

A first 3D display device according to the present invention comprises an LCD panel on which pixels for left eye images and pixels for right eye image are alternately displayed, a display driving circuit unit for generating a left eye image signal and a right eye image signal for displaying a left eye image and a right eye image by the pixels for left eye images and the pixels for right eye image on the LCD panel, a shading barrier having a slit and a barrier for producing a binocular parallax effect, a sensor for sensing the position of the head of a viewer, position sensing means for sensing whether the head of the viewer is in a normal view position, a reversed view position or a position spaced approximately one-fourth to approximately three-fourths of the distance between the eyes of the viewer apart from the center of the normal view position by an output of the sensor, and barrier movement means for laterally moving the barrier of the shading barrier from the initial position when the position sensing means senses that the head of the viewer is in the position spaced approximately one-fourth to approximately three-fourths of the distance between the eyes of the viewer apart from the center of the normal view position.

When the barrier of the shading barrier is laterally moved by the barrier movement means, the range in which 3D images can be viewed is laterally moved, whereby normal 3D images can be viewed even in a position to be a crosstalk region or a black region when the shading barrier is fixed.

The first 3D display device may be so constructed that the barrier movement means moves the barrier of the shading barrier by one-fourth of its pitch.

The first 3D display device can be so constructed that shutters which are turned on and off are respectively provided in both ends in the lateral direction of the slit of the shading barrier, and the barrier movement means turns the shutters on and off, to laterally move the barrier.

The first 3D display device can be so constructed that the shutter is composed of a liquid crystal shutter.

The first 3D display device may be so constructed that the barrier movement means returns the position of the barrier of the shading barrier to its initial state when it is sensed that the head of the viewer is moved to the reversed view position, and the display driving circuit unit generates a left eye image signal and a right eye image signal for displaying a left eye image and a right eye image obtained by replacing the pixels for left eye images and the pixels for right eye image on the initial screen of the LCD panel.

The first 3D display device can be so constructed that the shading barrier is composed of an LCD panel, the barrier of the shading barrier being switched to its on and off states, and the display driving circuit unit switches display on the LCD panel between display of 3D images and display of two-dimensional (2D) images.

The first 3D display device may be so constructed that the barrier movement means moves the barrier in a direction opposite to the direction in which the head of the viewer is moved when the shading barrier is arranged between a light source and the LCD panel.

Furthermore, the first 3D display device may be so constructed that the barrier movement means moves the barrier of the shading barrier toward either one of the left and the right from the initial position when the shading barrier is arranged between the light source and the LCD panel, and the left eye image signal and the right eye image signal are continuously generated without replacing the pixels for left eye images and the pixels for right eye image on the LCD panel when the direction in which the head of the viewer is moved and the direction in which the shading barrier is moved are opposite to each other, while a left eye image signal and a right eye image signal for displaying a left eye image and a right eye image obtained by replacing the pixels for left eye images and the pixels for right eye image on the LCD panel are generated when the directions are the same.

The first 3D display device may be so constructed that the barrier movement means moves the barrier in the same direction as the direction in which the head of the viewer is moved when the shading barrier is arranged between the LCD panel and the viewer.

Furthermore, the first 3D display device may be so constructed that the barrier movement means moves the barrier of the shading barrier toward either one of the right and the left from the initial position when the shading barrier is arranged between the LCD panel and the viewer, and the left eye image signal and the right eye image signal are continuously generated without replacing the pixels for left eye images and the pixels for right eye image on the LCD panel when the head of the viewer is moved in the one direction, while a left eye image signal and a right eye image signal for displaying a left eye image and a right eye image obtained by replacing the pixels for left eye images and the pixels for right eye image on the LCD panel are generated when the head of the viewer is moved in the opposite direction.

A second 3D display device according to the present invention comprises an LCD panel on which pixels for left eye images and pixels for right eye image are displayed, a display driving circuit unit for generating a left eye image signal and a right eye image signal for displaying a left eye image and a right eye image by the pixels for left eye images and the pixels for right eye image on the LCD panel, a light source provided on the light incidence side of the LCD panel for emitting light in a plane shape, a first shading barrier arranged between the light source and the LCD panel in which a barrier producing a binocular parallax effect is so constructed that it can appear or disappear, a second shading barrier arranged on the light emission side of the LCD panel in which a barrier producing a binocular parallax effect is so constructed that it can appear or disappear, a sensor for sensing the position of the head of a viewer, position sensing means for sensing whether or not the head of the viewer is in a normal view position, a reversed view position or a position spaced approximately one-fourth to approximately three-fourths of the distance between the eyes of the viewer apart from the center of the normal view position by an output of the sensor as well as sensing positions ahead of and behind the viewer, and barrier movement means for laterally moving the barrier of the first or second shading barrier from the initial position when the head of the viewer is in the position spaced approximately one-fourth to approximately three-fourths of the distance between the eyes of the viewer apart from the center of the normal view position by the position sensing means.

The second 3D display device may be so constructed that the distance between the LCD panel and the first shading barrier and the distance between the LCD panel and the second shading barrier differ from each other.

As described in the foregoing, the barriers of the shading barriers arranged on the light incidence side and the light emission side of the LCD panel are switched and selected, whereby a gap between each of the shading barriers and the LCD panel can be finely adjusted, and the proper viewing distance can be finely adjusted.

The above-mentioned construction makes it possible to enlarge the range in which 3D images can be viewed with respect to forward or backward movement and leftward or rightward movement of the viewer.

The second 3D display device may be so constructed that the barrier movement means moves the barrier of the shading barrier by one-fourth of its pitch.

The second 3D display device may be so constructed that the barrier movement means returns the position of the barrier of the shading barrier to its initial state when the position sensing means senses that the head of the viewer is moved to the reversed view position, and a left eye image signal and a right eye image signal for displaying a left eye image and a right eye image obtained by replacing the pixels for left eye images and the pixels for right eye image on the initial screen of the LCD panel are generated.

The second 3D display device can be so constructed that a group of pixels for left eye images and a group of pixels for right eye image on the display screen of the LCD panel are replaced with each other in correspondence to the position of the head of the viewer with respect to information relating to positions in the lateral direction of the viewer by the sensor, and the proper viewing distance of a 3D image is switched by switching the appearance of the barrier of the first or second shading barrier with respect to information relating to positions in the longitudinal direction of the viewer.

The second 3D display device can be so constructed that the direction in which the head of the viewer is moved and the direction in which the barrier is moved coincide with each other when the barrier of the second shading barrier appears and the barrier of the first shading barrier disappears with respect to information corresponding to the position of the head of the viewer which is spaced approximately one-fourth to approximately three-fourths of the distance between the eyes of the viewer apart from the center of the normal view position by the sensor.

Furthermore, the second 3D display device may be so constructed that the direction in which the head of the viewer is moved and the direction in which the barrier is moved are opposite to each other when the barrier of the first shading barrier appears and the barrier of the second shading barrier disappears with respect to information corresponding to the position of the head of the viewer which is spaced approximately one-fourth to approximately three-fourths of the distance between the eyes of the viewer apart from the center of the normal view position by the sensor.

The second 3D display device may be so constructed that in a case where the direction in which the barrier is moved is one direction with respect to information corresponding to the position of the head of the viewer which is spaced approximately one-fourth to approximately three-fourths of the distance between the eyes of the viewer apart from the center of the normal view position, and the barrier of the second shading barrier appears and the barrier of the first shading barrier disappears, the left eye image signal and the right eye image signal are continuously generated without switching the pixels for left eye images and the pixels for right eye image on the LCD panel when the direction in which the head of the viewer is moved and the direction in which the barrier is moved are the same, while a left eye image signal and a right eye image signal for displaying a left eye image and a right eye image obtained by switching the pixels for left eye images and the pixels for right eye image on the LCD panel are generated when the directions are opposite to each other.

Furthermore, the second 3D display device may be so constructed that in a case where the direction in which the barrier is moved is one direction with respect to information corresponding to the position of the head of the viewer which is spaced approximately one-fourth to approximately three-fourths of the distance between the eyes of the viewer apart from the center of the normal view position, and the barrier of the first shading barrier appears and the barrier of the second shading barrier disappears, the left eye image signal and the right eye image signal are continuously generated without switching the pixels for left eye images and the pixels for right eye image on the LCD panel when the direction in which the head of the viewer is moved and the direction in which the barrier is moved are opposite to each other, while a left eye image signal and a right eye image signal for displaying a left eye image and a right eye image obtained by switching the pixels for left eye images and the pixels for right eye image on the LCD panel are generated when the directions are same.

The foregoing and other objects, features, aspects and advantages of the present invention will become more apparent from the following detailed description of the present invention when taken in conjunction with the accompanying drawings.

PREFERRED EMBODIMENT OF THE PRESENT INVENTION

The principle of a 3D display device according to the present invention will be described on the basis of FIGS. 1 to 4.

Figure 1:
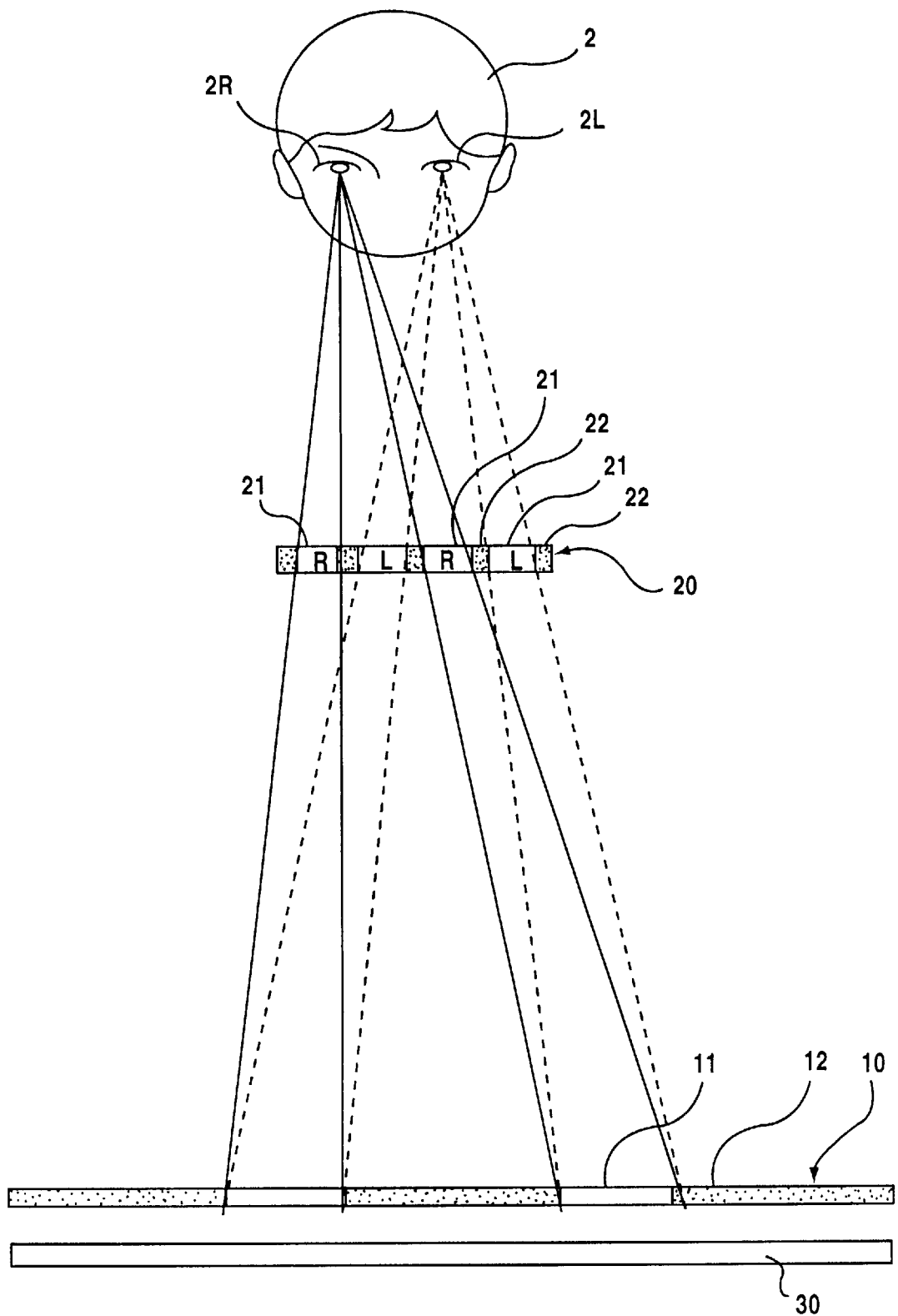
FIG. 1 is a typical view showing the principle of viewing 3D images in a normal view position.

As shown in FIG. 1, in the 3D display device, a shading barrier 10 which is constituted by vertical stripe-shaped slits 11 and barriers 12 is arranged between an LCD panel 20 and a light source 30 emitting light in a plane shape. The light emitted from the light source 30 to pass through the slit 11 of the shading barrier 10 is incident on the right eye 2R and the left eye 2L of a viewer 2 upon passing through pixel apertures 21 of the LCD panel 20. A black matrix portion 22 is provided between the pixel apertures 21 of the LCD panel 20.

A right eye image R and a left eye image L are displayed for each pitch on the pixel apertures 21 of the LCD panel 20. The light passing through each of the slits 11 of the shading barrier 10 is divided into light for a left eye image and light for a right eye image. The light for a left eye image and the light for a right eye image respectively pass through the pixel aperture 21 for a left eye image and the pixel aperture 21 for a right eye image, to be converged on the left eye 2L and the right eye 2R of the viewer 2. The viewer 2 respectively views the right eye image R and the left eye image L with the right eye 2R and the left eye 2L. As a result, normal 3D images can be viewed. That is, the viewer 2 can view 3D images by a binocular parallax effect produced by the barriers 12 of the shading barrier 10.

Figure 2:
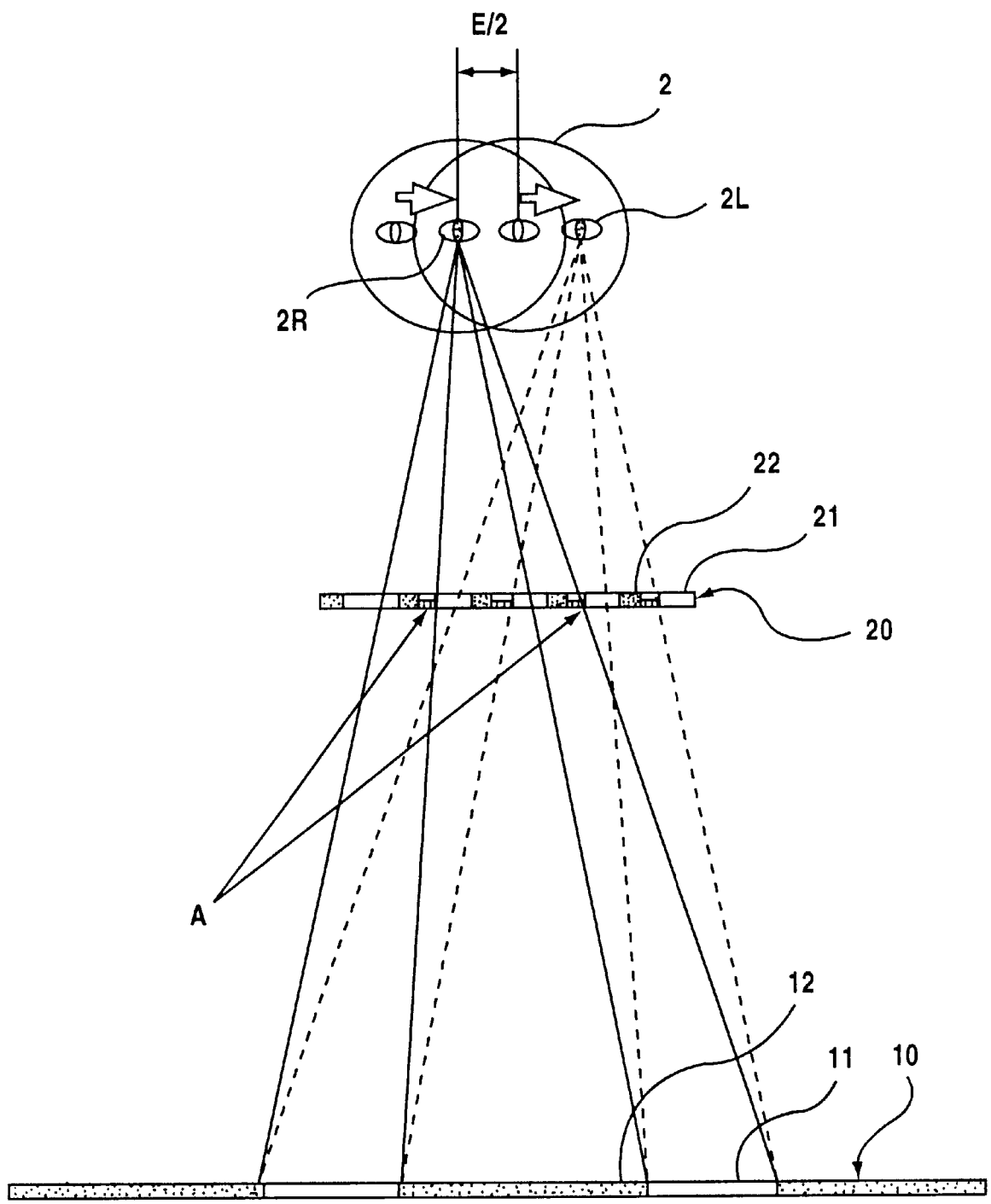
FIG. 2 is a typical view showing the principle of viewing in a crosstalk position.

As shown in FIG. 2, the head of the viewer 2 shall be moved by an amount (E/2) which is one-half of the distance between the eyes (E) rightward from the position shown in FIG. 1. The head of the viewer 2 is moved to a right crosstalk position by the movement. Light passing through the pixel aperture 21 for a left eye image and light passing through the pixel aperture 21 for a right eye image after passing through each of the slits 11 of the shading barrier 10 are mixed with each other in the right eye 2R or the left eye 2L of the viewer 2. For example, the viewer 2 views an extra left eye image A in addition to a right eye image with the right eye 2R, whereby normal 3D images cannot be viewed. At the same time, a part of the light is intercepted by the black matrix portion 20 of the LCD panel 20, whereby a screen becomes dark.

Figure 3:
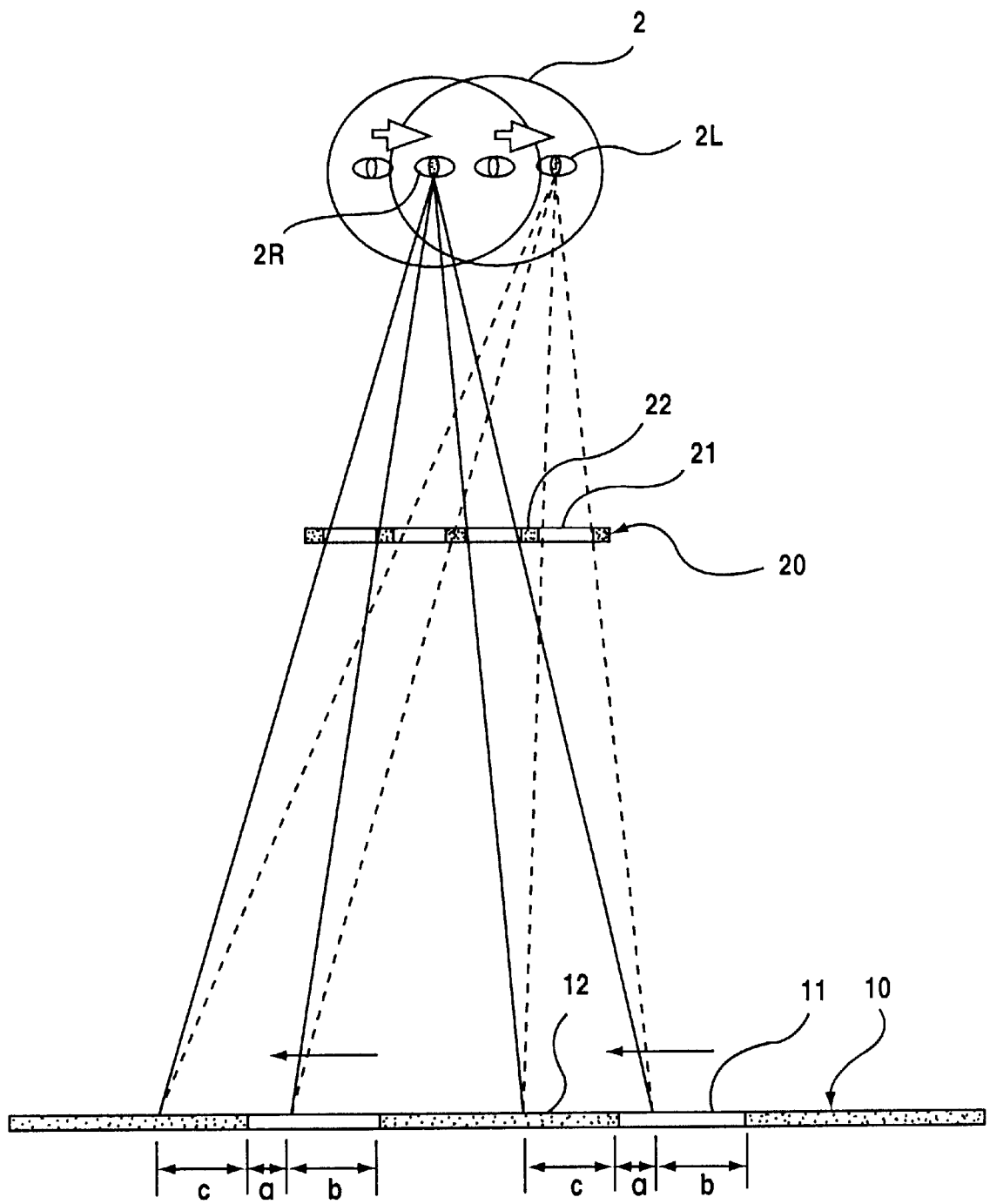
FIG. 3 is a typical view showing the positional relationship among the lines of sight in viewing in a crosstalk position, pixels on an LCD panel and slits of a fixed shading barrier.

As shown in FIG. 3, a region of the shading barrier 10 which the viewer 2 views with the right eye 2R at this time becomes a part a of the slit 11 and a part c of the barrier 12 on the left side thereof, whereby a part b of the slit 11 on the right side thereof cannot be viewed.

Figure 4:
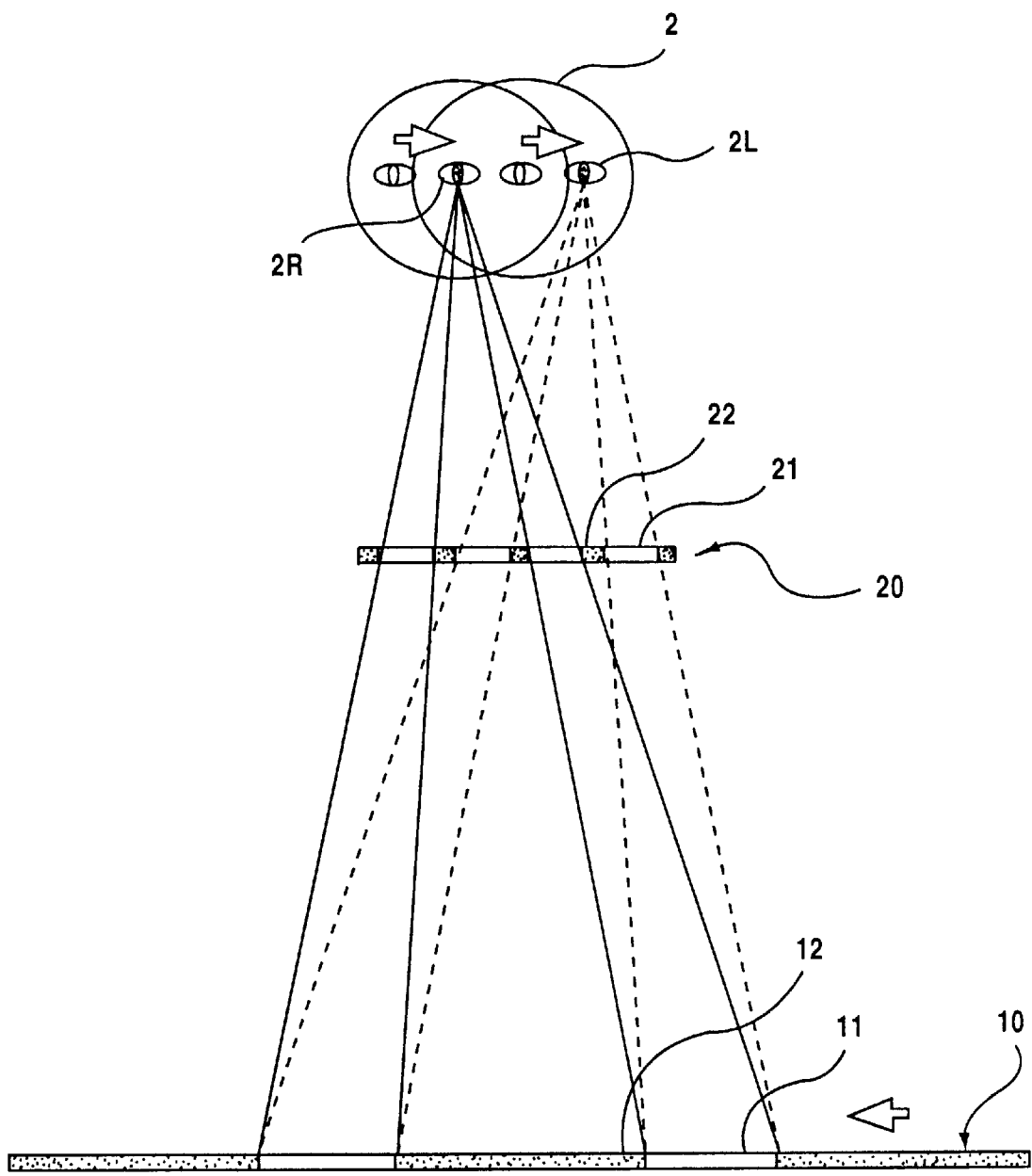
FIG. 4 is a typical view showing the positional relationship between the lines of sight in viewing in a crosstalk position and slits of a shading barrier in which 3D images can be viewed.

As shown in FIG. 4, when the shading barrier 10 is slightly shifted leftward in the drawing, the entire slit 11 of the shading barrier 10 which the viewer 2 views with the right eye 2R can be viewed. Light passing through the pixel aperture 21 for a left eye image and light passing through the pixel aperture 21 for a right eye image are separated from each other, whereby normal 3D images can be viewed.

The 3D display device comprises a sensor (not shown) for sensing the position of the head of the viewer 2 and barrier movement means for laterally moving the shading barrier 10 from the initial position when the sensor senses that the head of the viewer 2 is in a position where normal 3D images cannot be viewed, that is, a moire position in a case where the shading barrier 10 is fixed.

Figure 5:
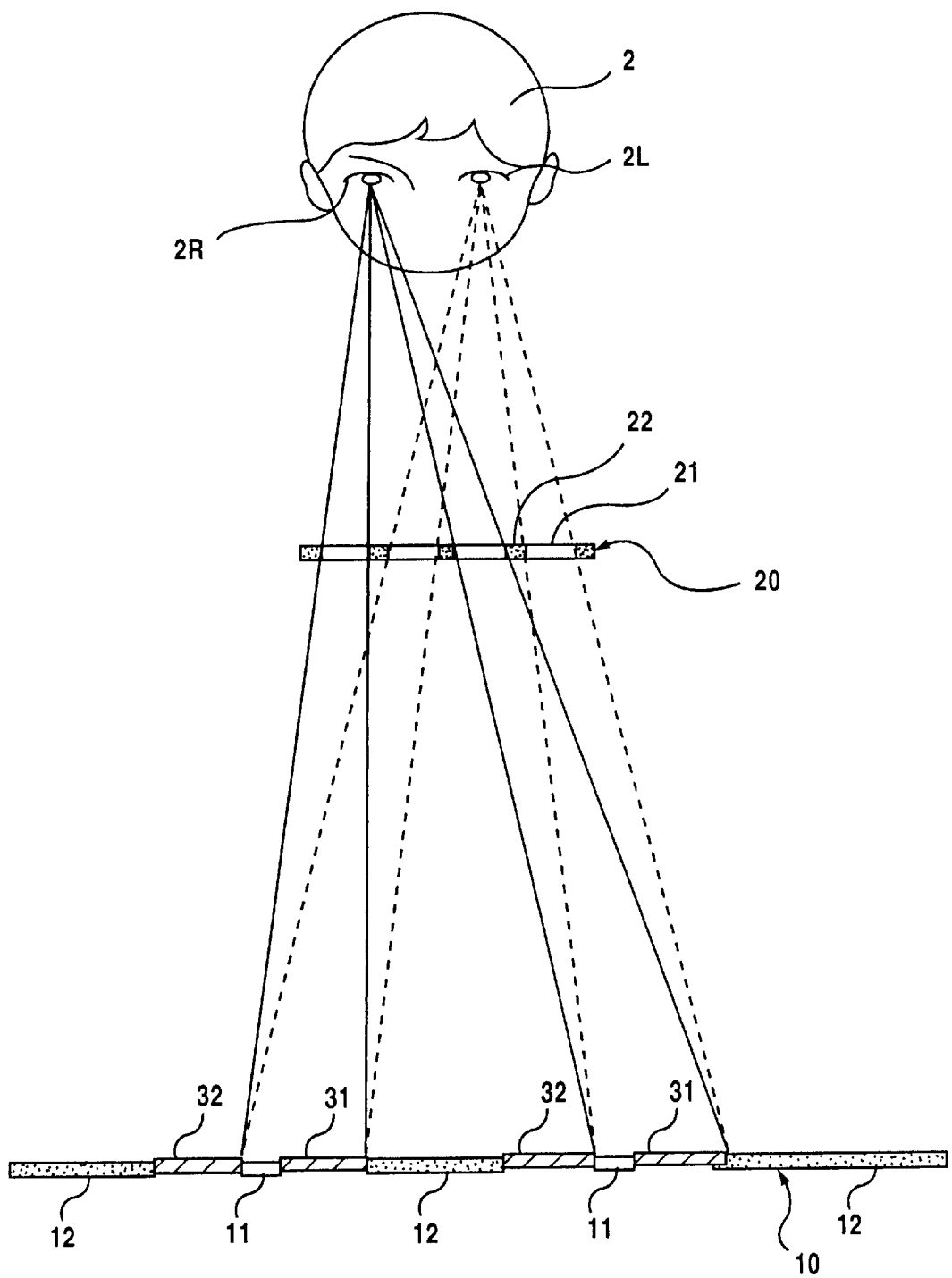
FIG. 5 is a typical view showing the principle of viewing 3D images in a normal view position in a first embodiment of the present invention.
Figure 6:
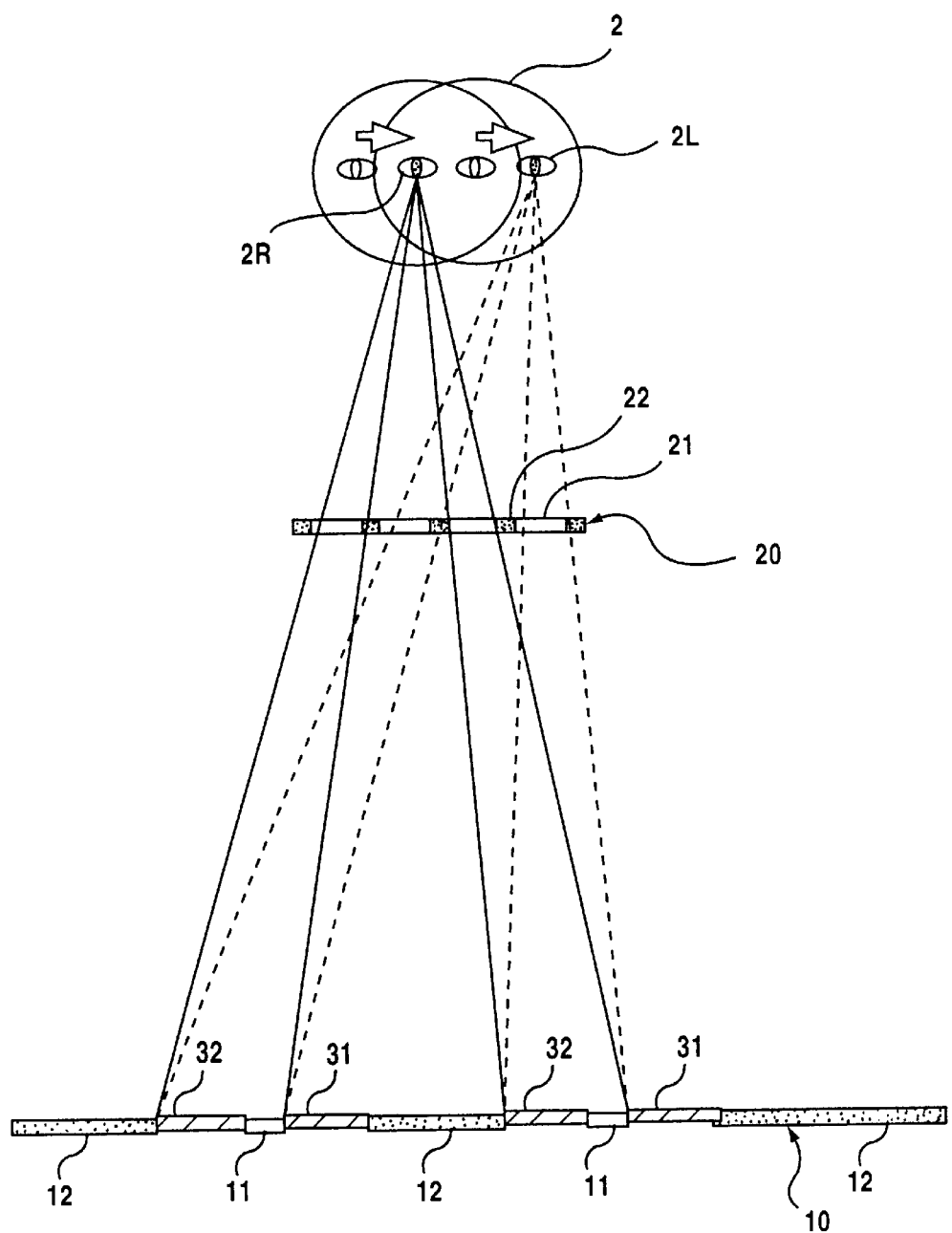
FIG. 6 is a typical view showing the principle of viewing 3D images in a position between a normal view position and a reversed view position in the first embodiment of the present invention.

The barrier movement means may comprise a machine mechanism for mechanically moving the shading barrier 10. In the present invention, however, barrier movement means comprising liquid crystal shutters 31 and 32 arranged in both ends in the lateral direction of the slit 11 of the shading barrier 10 fixedly located, as shown in FIGS. 5 and 6, and a control circuit unit for selectively turning the liquid crystal shutters 31 and 32 on and off upon input of an output of the above-mentioned sensor which is not illustrated is used in order to make the delay of control as little as possible.

Figure 7:
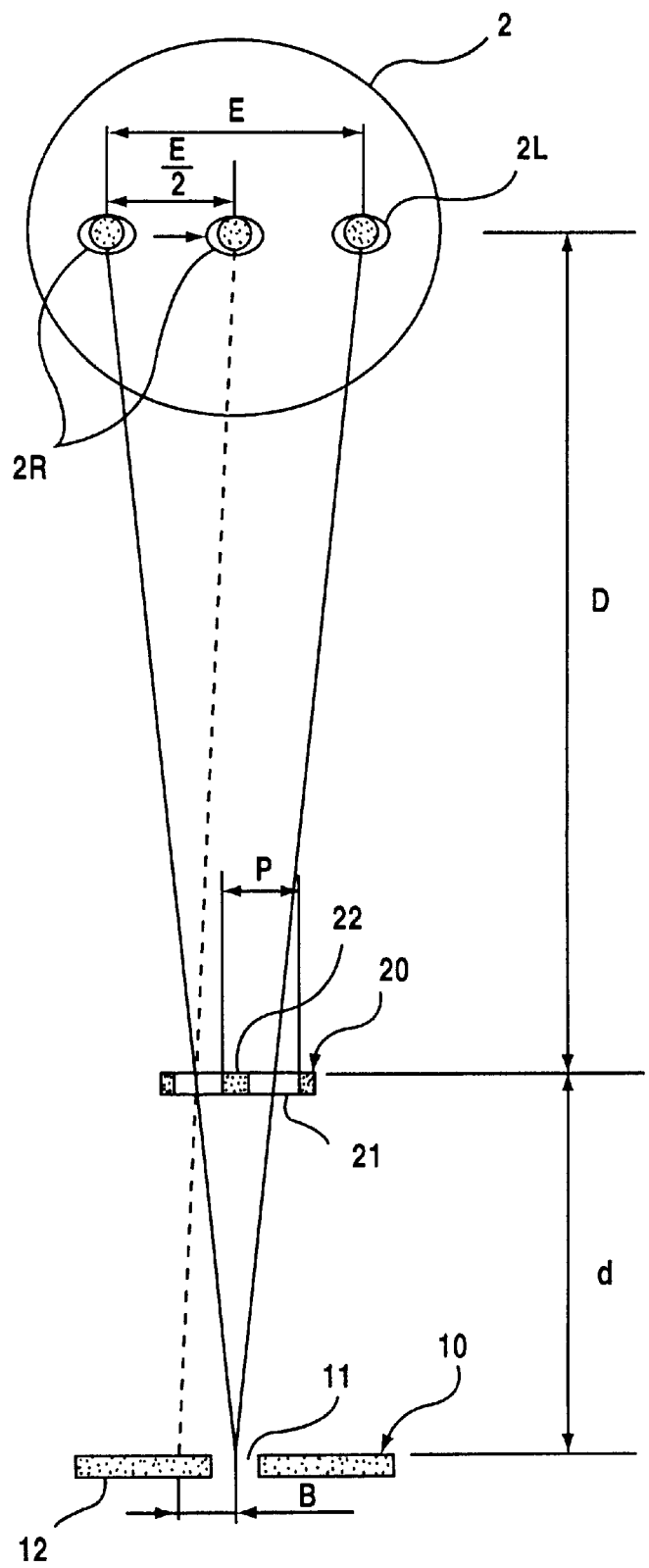
FIG. 7 is a typical view showing the principle of finding the amount of movement of a shading barrier in the present invention.

As indicated by a solid line in FIG. 7, the line of sight passing through the center of each of the pixel apertures 21 from the right eye 2R in the proper viewing position passes through the center of the slit 11 of the shading barrier 10. As indicated by a broken line in FIG. 7, the line of sight passing through the center of each of the pixel apertures 21 from the right eye 2R which is moved by one-half of the distance between the eyes from the proper viewing position strikes the barrier 12 of the shading barrier 10. At this time, when the sensor senses that the viewer cannot view normal 3D images in this position, the slit 11 of the shading barrier 10 may be so moved that the center of the moire position becomes the center of the normal view position. Letting B be the amount of movement of the slit 11, d be the distance between the LCD panel 20 and the shading barrier 10, P be the pitch between pixels on the LCD panel 20, D be the spacing between the LCD panel 20 and the eyes, and E be the distance between the eyes, the relationships indicated by the following equations (1) and (2) hold:

$$P:d=E:(D+d) \quad (1)$$

$$B:d=E/2:D \quad (2)$$

Figure 8:
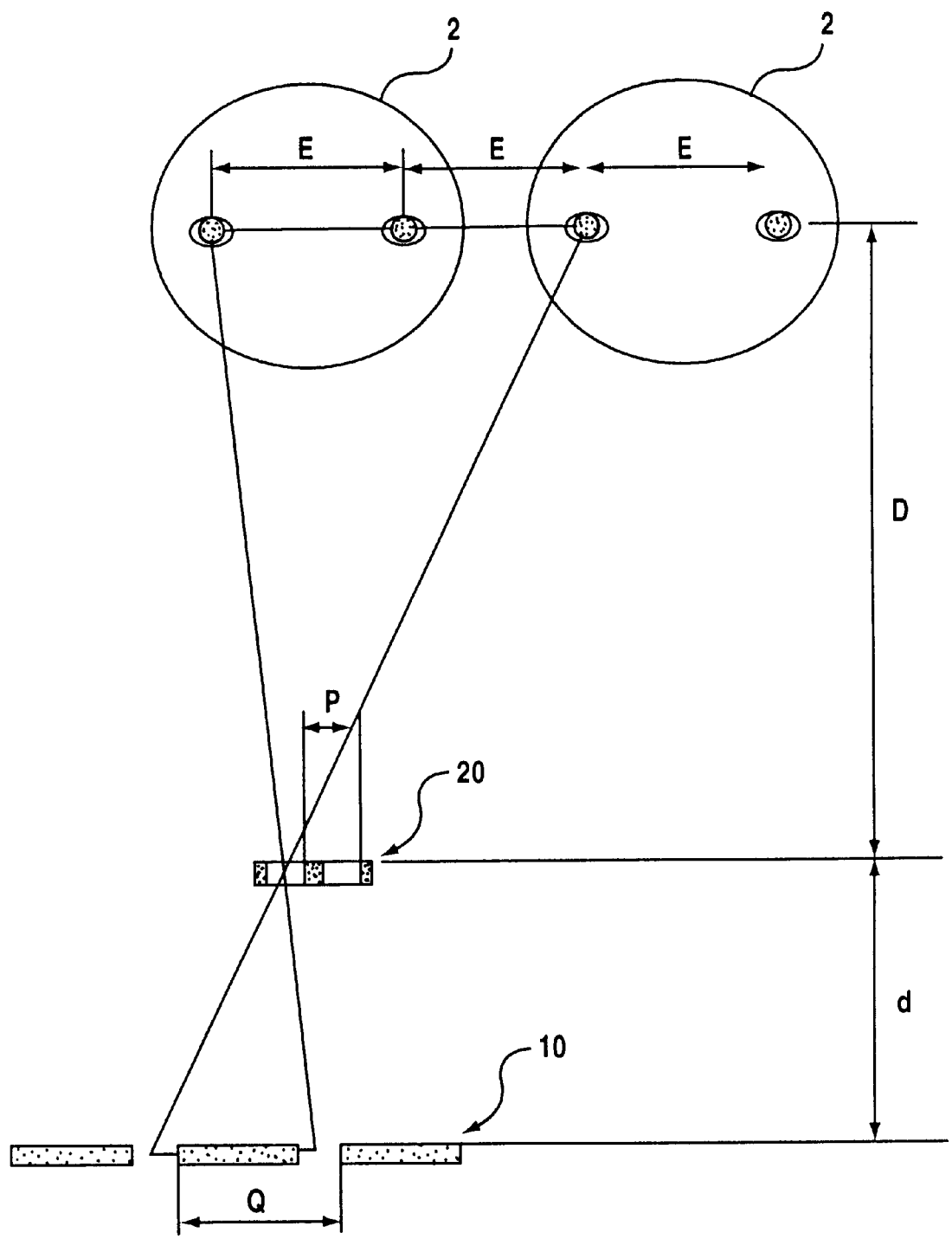
FIG. 8 is a typical view showing a principle indicating the relationship between the pitch of the shading barrier and the pitch of pixels on the LCD panel in the present invention.

As shown in FIG. 8, the relationship indicated by the following equation (3) holds among the pitch Q of the shading barrier 10, the distance between the eyes E, the distance d between the LCD panel 20 and the shading barrier 10, and the spacing between the LCD panel 20 and the eyes:

$$2E:D=Q:d \quad (3)$$

The relationships indicated by the following equations (4) to (6) can be found from the equations (1) to (3):

$$D=(E-P)d/P \quad (4)$$

$$Q=(E-P)/2EP \quad (5)$$

$$B=Q/4 \quad (6)$$

From the foregoing equations (4) to (6), the distance between the LCD panel 20 and the eyes, that is, the proper viewing distance D is determined by the distance d between the shading barrier 10 and the LCD panel 20 and the pitch between pixels P. When the pitch between pixels P is constant, therefore, the proper viewing distance D is determined by the distance d between the shading barrier 10 and the LCD panel 20. The pitch Q of the shading barrier 10 is determined by the pitch between pixels P, that is, the pitch Q of the shading barrier 10 is determined by the pitch between pixels P on the LCD panel 20 used.

It is found that the shading barrier 10 may be moved by one-fourth of the pitch Q of the shading barrier 10 thus determined. Consequently, the width of each of the liquid crystal shutters 31 and 32 is set to one-fourth of the pitch Q of the shading barrier 10.

Furthermore, when the head of the viewer 2 is moved to a so-called reversed view position where right and left images are respectively viewed with the different eyes, the viewer 2 can view normal 3D images by returning the position of the shading barrier 10 to its initial state and replacing the right eye image and the left eye image on the LCD panel 20.

Therefore, the 3D display device is provided with image replacement means for replacing the right eye image and the left eye image on the LCD panel 20 when the sensor senses that the head of the viewer 2 is in the reversed view position.

Figure 9:
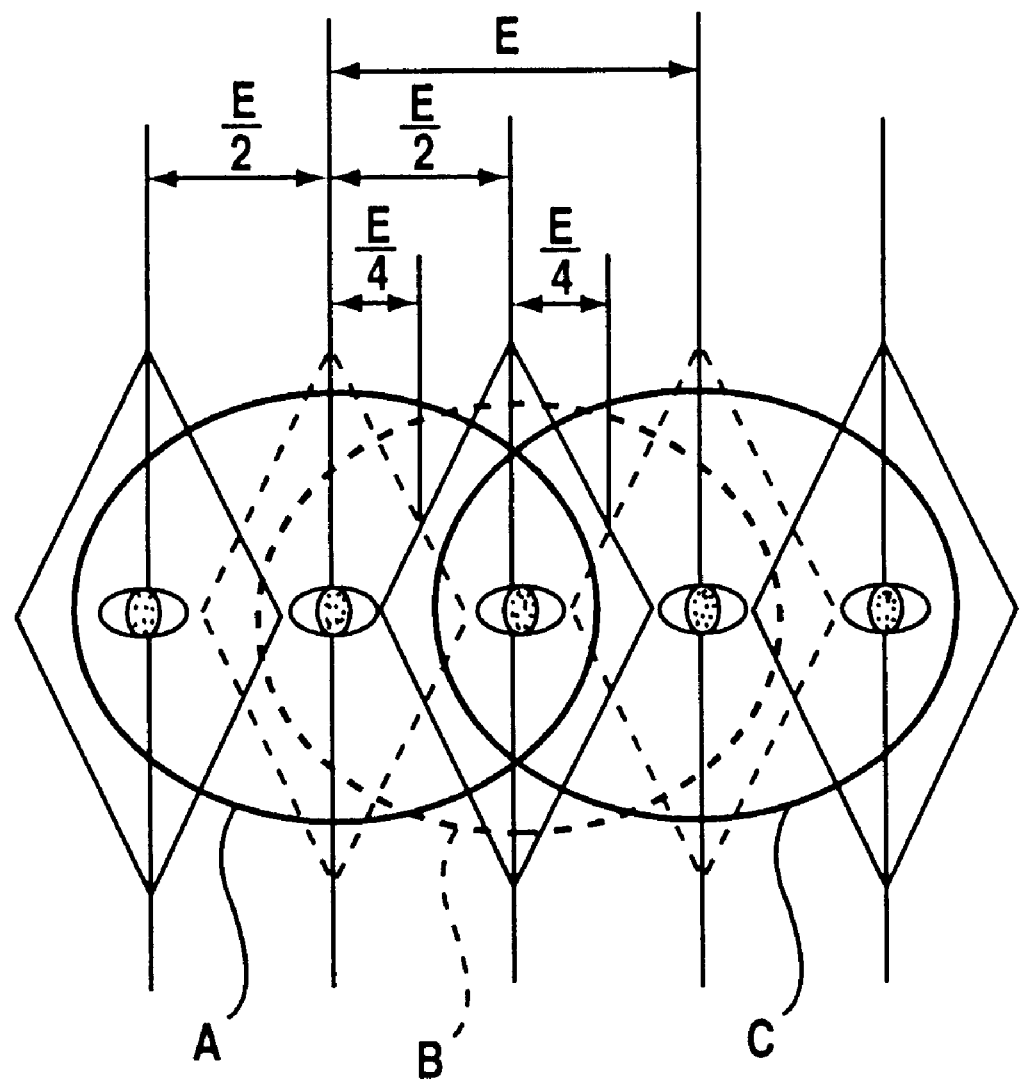
FIG. 9 is a typical view showing the principle of viewing 3D images in a normal view position, a reversed view position and a moire position in the present invention.

FIG. 9 illustrates a relationship in which the viewer 2 leads to a reversed view position C from a normal view position A through a moire position B. In the normal view position A and the reversed view position C, the position of the shading barrier 10 is in the initial state, whereby the viewer 2 respectively views diamond-shaped regions indicated by solid lines. In the normal view position A and the reversed view position C, the viewer 2 can view 3D images by replacing the right eye image and the left eye image on the LCD panel 20. In the moire position B, the shading barrier 10 is moved by one-fourth of the pitch Q of the shading barrier 10, whereby the viewer 2 views diamond-shaped regions indicated by broken lines.

From the relationship among the normal view position A, the moire position B and the reversed view position C shown in FIG. 9, if the shading barrier 10 is moved by one-fourth of the pitch Q of the shading barrier 10 in a case where the head of the viewer 2 is moved by E/4 from the center of the normal view position A, the viewer 2 can view the diamond-shaped regions indicated by the broken lines in FIG. 9 even if the head of the viewer 2 is further moved in the same direction. Therefore, it is possible to prevent moire and crosstalk from being viewed by the viewer 2. Further, if the position of the shading barrier 10 is returned to the initial state in a case where the head of the viewer 2 is moved in the same direction to a position spaced 3E/4 apart from the center of the normal view position A, the viewer 2 can view the diamond-shaped regions indicated by the solid lines in the reversed view position even if the head of the viewer 2 is thereafter moved in the same direction. Therefore, it is possible to prevent moire and crosstalk from being viewed by the viewer 2. At this time, the right eye image and the left eye image on the LCD panel 20 are replaced with each other. The shading barrier 10 may be moved by only one-fourth of the pitch Q in a state where the head of the viewer 2 is moved to a position spaced approximately E/4 to 3E/4 apart from the center of the normal view position (the moire position).

Figure 10:
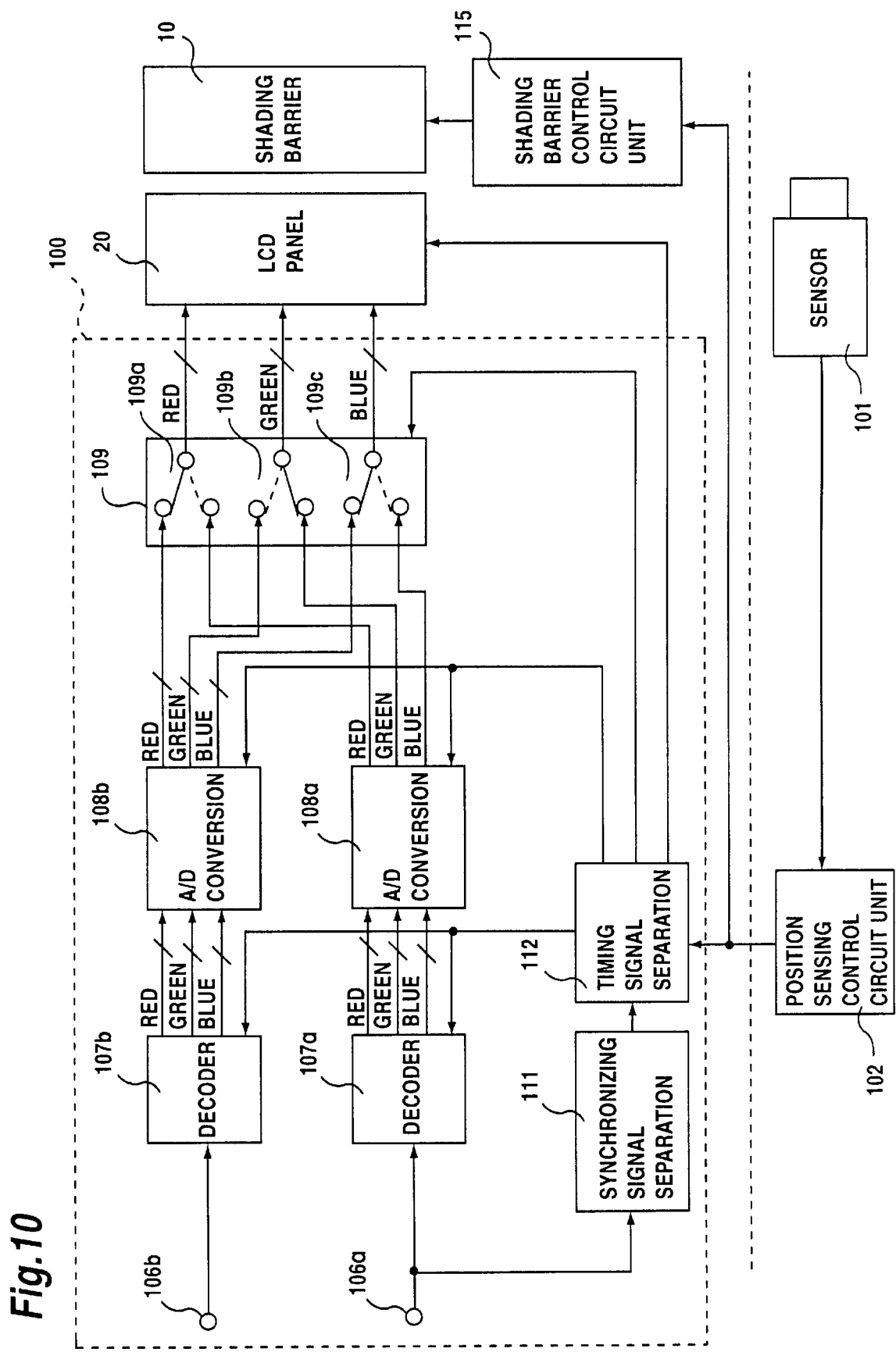
FIG. 10 is a block diagram showing the construction of a 3D display device according to the first embodiment of the present invention.

FIG. 10 is a block diagram showing the construction of the above-mentioned 3D display device. The block diagram is a diagram in a case where the present invention is applied to a color liquid crystal 3D display device.

An output from a sensor 101 for sensing the position of a viewer viewing a 3D image displayed on the LCD panel 20 is fed to a position sensing control circuit unit 102. The position sensing control circuit unit 102 senses whether the head of the viewer 2 is in a normal view position or a reversed view position by the output of the sensor 101, and feeds a control signal corresponding to the position to a display driving circuit unit 100. Further, the position sensing control circuit unit 102 senses whether or not the head of the viewer 2 is in a position spaced approximately E/4 to 3E/4 apart from the center of the normal view position (a moire position) by the output of the sensor 101, and feeds the signal to a shading barrier control circuit unit 115.

The display driving circuit unit 100 respectively generates a left eye image signal and a right eye image signal to be fed to the LCD panel 20, and feeds the image signals to the LCD panel 20. The display driving circuit unit 100 feeds the image signals so as to display a left eye image and a right eye image on the LCD panel 20 on the basis of the output from the position sensing control circuit unit 102 when the head of the viewer 2 is in the normal view position, while feeding image signals to be fed to the LCD panel 20 upon switching the left eye image and the right eye image on the LCD panel 20 on the basis of the output from the position sensing control circuit unit 102 when the head of the viewer 2 is in the reversed view position.

A specific example of the display driving circuit unit 100 will be further described. A left eye image signal which is a composite signal comprising a luminance signal Y and a color difference signal C is fed to a first input terminal 106a of the display driving circuit unit 100, and a right eye image signal which is a composite signal comprising a luminance signal Y and a color difference signal C is fed to a second input terminal 106b. The left eye composite signal fed to the first input terminal 106a is converted into signals representing red, green and blue primary colors by a first decoder 107a, and the right eye composite signal fed to the second input terminal 106b is converted into signals representing red, green and blue primary colors by a second decoder 107b. The primary color signals obtained by the conversion in the first and second decoders 107a and 107b are respectively converted into digital data in first and second analog-to-digital (A/D) conversion circuit units 108a and 108b. The digital data representing red, green and blue primary colors for left eye and right eye outputted from the first and second A/D conversion circuit units 108a and 108b are fed to a multiplexer 109. The multiplexer 109 selects one of the primary color data for left eye and the primary color data for right eye for each primary color, and feeds the selected primary color data to the LCD panel 20. A 3D image is displayed in accordance with the red, green and blue primary color data selectively outputted from the multiplexer 109 on the LCD panel 20.

The multiplexer 109 comprises a first switch 109a for selecting one of the two red primary color data inputted from the first and second A/D conversion circuit units 108a and 108b, a second switch 109b for selecting one of the two green primary color data inputted from the first and second A/D conversion circuit units 108a and 108b, and a third switch 109c for selecting one of the two blue primary color data inputted from the first and second A/D conversion circuit units 108a and 108b. The multiplexer 109 is switched between a first selected state (indicated by solid lines) where the first switch 109a selects the red primary color data for right eye from the second A/D conversion circuit unit 108b, the second switch 109b selects the green primary color data for left eye from the first A/D conversion circuit unit 108a, and the third switch 109c selects the blue primary color data for right eye from the second A/D conversion circuit unit 108b and a second selected state (indicated by broken lines) where the first switch 109a selects the red primary color data for left eye from the first A/D conversion circuit unit 108a, the second switch 109b selects the green primary color data for right eye from the second A/D conversion circuit unit 108b, and the third switch 109c selects the blue primary color data for left eye from the first A/D conversion circuit unit 108a. The first selected state and the second selected state are switched for each of first and second data output periods (for each one dot clock) within one horizontal scanning period on the LCD panel 20.

A synchronizing signal separation circuit unit 111 extracts horizontal and vertical synchronizing signals from the left eye signal inputted to the first input terminal 106a, and feeds the synchronizing signals to a timing signal generation circuit unit 112. The timing signal generation circuit unit 112 generates a timing signal for controlling the timing of operations performed by the first and second decoders 107a and 107b, the first and second analog-to-digital (A/D) conversion circuit units 108a and 108b, the multiplexer 109, and the LCD panel 20 in accordance with the synchronizing signals.

The output from the sensor 101 for sensing the position of the head of the viewer 2 viewing the 3D image displayed on the LCD panel 20 is fed to the position sensing control circuit unit 102. The position sensing control circuit unit 102 senses, by the output from the sensor 101, whether the head of the viewer 2 is in the normal view position, the position spaced approximately E/4 to 3E/4 apart therefrom (a moire position), or the reversed view position, and feeds a control signal corresponding to the position to the timing signal generation circuit unit 112 and the shading barrier control circuit unit 115.

The shading barrier control circuit unit 115 controls the on and off states of the liquid crystal switches 31 and 32 of the shading barrier 10 depending on whether or not the head of the viewer 2 is in the position spaced approximately E/4 to 3E/4 apart (the moire position), to control the position of the barrier of the shading barrier 10.

The position sensing control circuit unit 102 outputs a first control signal to the timing signal generation circuit unit 112 when the head of the viewer 2 is in the normal view position on the LCD panel 20, while outputting a second control signal to the timing signal generation circuit unit 112 when the head of the viewer 2 is in the reversed view position on the LCD panel 20. Further, the position sensing control circuit unit 102 outputs a third control signal when the head of the viewer 2 is in the position spaced approximately E/4 to 3E/4 apart (the moire position).

The timing signal generation circuit unit 112 reverses the switching of the first and second selected states of each of the switches 109a, 109b and 109c in the multiplexer 109 depending on the control signal from the position sensing control circuit unit 102. Specifically, at a certain time point, for example, when the timing signal generation circuit unit 112 inputs the first control signal, each of the switches 109a, 109b and 109c enters the first selected state. At the same time point, however, when the second control signal is fed to the timing signal generation circuit unit 112, each of the switches 109a, 109b and 109c enters the second selected state. The timing of switching the first and second selected states of each of the switches 109a, 109b and 109c in a case where the timing signal generation circuit unit 112 inputs the first control signal is taken as first switching timing, and the timing of switching the first and second selected states of each of the switches 109a, 109b and 109c in a case where the second control signal is fed to the timing signal generation circuit unit 112 is taken as second switching timing.

When the head of the viewer 2 is positioned in the normal view position, the position sensing control circuit unit 102 outputs the first control signal to the timing signal generation circuit unit 112 and the shading barrier control circuit unit 115. Consequently, the timing signal generation circuit unit 112 sets the timing of switching the first and second selected states of each of the switches 109a, 109b and 109c in the multiplexer 109 to the first switching timing. The shading barrier control circuit unit 115 carries out such control that the liquid crystal shutter 31 is turned off and the liquid crystal shutter 32 is turned on.

Figure 11:
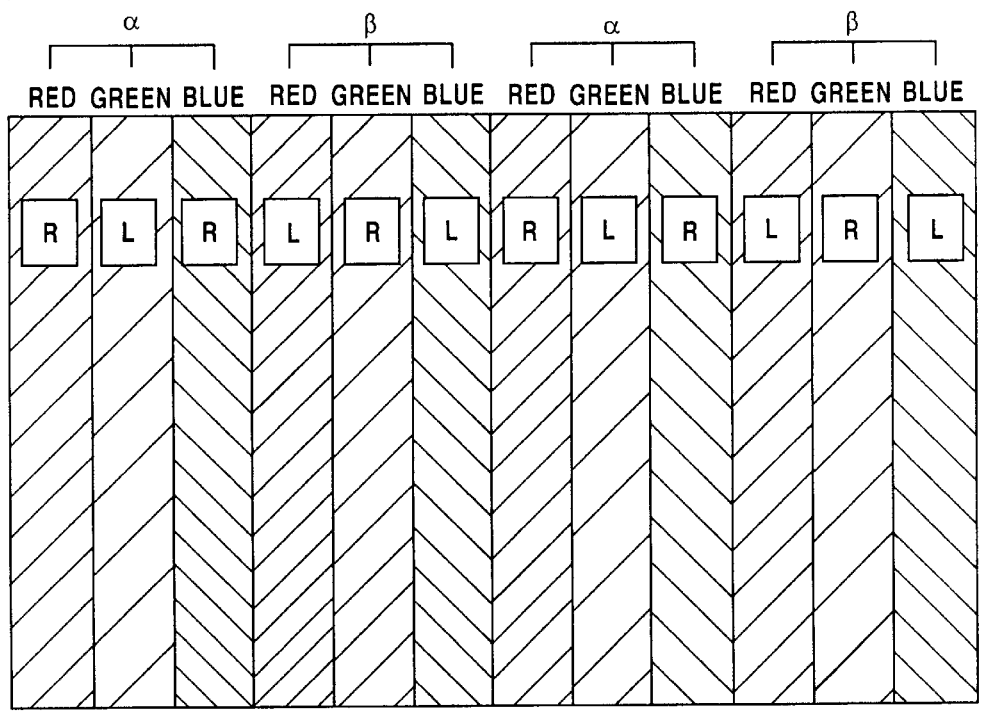
FIG. 11 is a typical view showing display on a display screen of the 3D display device according to the first embodiment of the present invention.

In the multiplexer 109, the first and second selected states of each of the switches 109a, 109b and 109c are switched in accordance with the first switching timing, whereby the display screen of the LCD panel 20 is as shown in FIG. 11. That is, in a first data output period α in a horizontal scanning period on the display screen, pixels caused by primary color data selected in the first selected state are displayed. In a second data output period β, pixels caused by primary color data selected in the second selected state are displayed. Each of the first and second data output periods α and β is composed of three red, green and blue columns of pixels.

Consequently, pixels for left eye images L are displayed in even columns of pixels which are first pixels on the display screen, and pixels for right eye image R are displayed in odd columns of pixels which are second pixels.

When the viewer 2 is in the normal view position, therefore, light from the pixels in even columns which are first pixels, that is, the pixels for left eye images L is incident on the left eye 2L of the viewer 2, and light from the pixels in odd columns which are second pixels, that is, the pixels for right eye image R is incident on the right eye 2R of the viewer 2. Therefore, the viewer 2 can view good 3D images in the normal viewing state.

When it is then sensed that the head of the viewer 2 is in the position spaced approximately E/4 to 3E/4 apart from the center of the normal view position (the moire position), the position sensing control circuit unit 102 outputs the third control signal, to control the liquid crystal shutters 31 and 32 arranged in both ends of the slit 11 of the shading barrier 10. As a result, the slit 11 of the shading barrier 10 is so moved that the center of the moire position is the center of the normal view position. At this time, images displayed on the LCD panel 20 are images in the first selected state.

Furthermore, when the head of the viewer 2 is moved to the reversed view position, the position of the shading barrier 10 is returned to the initial state, whereby the right eye image and the left eye image on the LCD panel 20 are replaced with each other. At this time, the position sensing control circuit unit 102 outputs the second control signal to the timing signal generation circuit unit 112. Consequently, the timing signal generation circuit unit 112 sets the timing of switching the first and second selected states of each of the switches 109a, 109b and 109c in the multiplexer 109 to the second switching timing.

Figure 12:
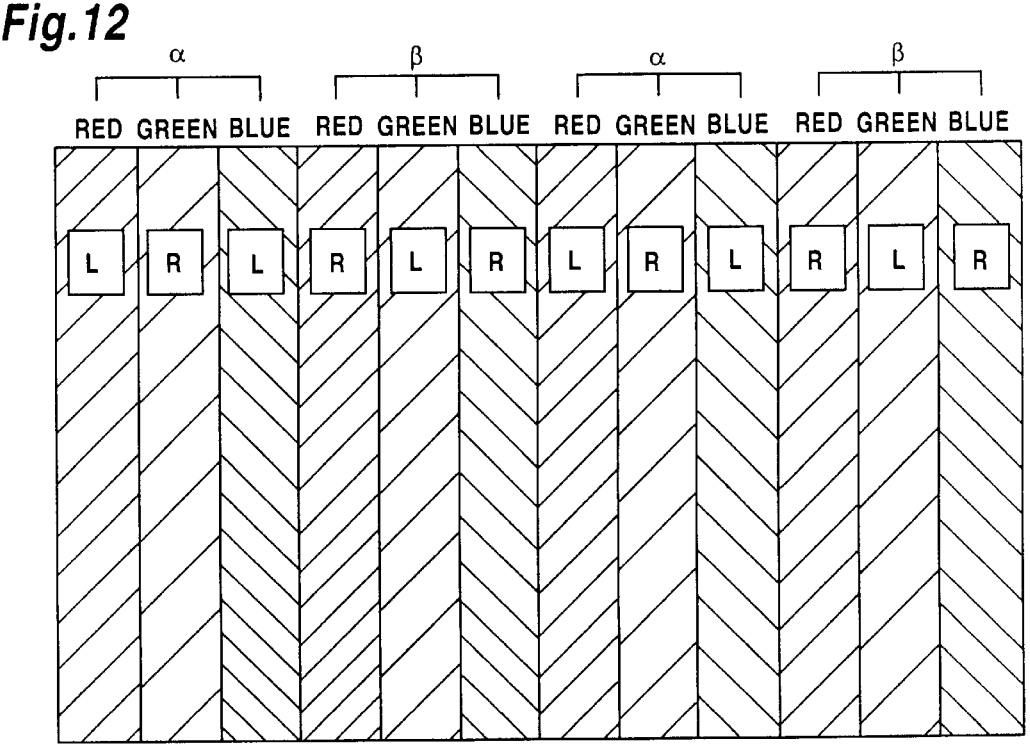
FIG. 12 is a typical view showing display on a display screen of the 3D display device according to the first embodiment of the present invention.

In the multiplexer 109, the first and second selected states of each of the switches 109a, 109b and 109c are switched in accordance with the second switching timing, whereby the display screen of the LCD panel 20 is as shown in FIG. 12. That is, in a first data output period α in a horizontal scanning period on the display screen, pixels caused by primary color data selected in the second selected state are displayed. In a second data output period β, pixels caused by primary color data selected in the first selected state are displayed.

Consequently, pixels for right eye image R are displayed in even columns of pixels which are first pixels on the display screen, and pixels for left eye images L are displayed in odd columns of pixels which are second pixels.

When the viewer 2 is in the reversed view position, light from the pixels in odd columns which are second pixels, that is, the pixels for left eye images L is incident on the left eye 2L of the viewer 2, and light from the pixels in even columns which are first pixels, that is, the pixels for right eye image R is incident on the right eye 2R of the viewer 2. Therefore, the viewer 2 can view good 3D images in the normal viewing state even if he or she is in the reversed view position.

In FIGS. 11 and 12, a black matrix portion between the pixels is omitted.

In the present embodiment, the replacement of images is made when the head of the viewer 2 is moved from the normal view position to the position spaced approximately E/4 to 3E/4 apart (the moire position) in a case where the head of the viewer 2 is moved from the normal view position through the position spaced approximately E/4 to 3E/4 apart therefrom (the moire position) on the left side thereof to the reversed view position on the left side thereof, while being made when the head of the viewer 2 is moved from the position spaced approximately E/4 to 3E/4 apart (the moire position) to the normal view position in a case where the head of the viewer 2 is moved from the reversed view position to the normal view position on the right side thereof through the position spaced approximately E/4 to 3E/4 apart therefrom (the moire position) on the right side thereof. On the other hand, the replacement of images is made when the head of the viewer 2 is moved from the position spaced approximately E/4 to 3E/4 apart (the moire position) to the reversed view position in a case where the head of the viewer 2 is moved from the normal view position to the reversed view position on the right side thereof through the position spaced approximately E/4 to 3E/4 apart therefrom (the moire position) on the right side thereof, while being made when the head of the viewer 2 is moved from the reversed view position to the position spaced approximately E/4 to 3E/4 apart (the moire position) in a case where the head of the viewer 2 is moved from the reversed view position to the normal view position on the left side thereof through the position spaced approximately E/4 to 3E/4 apart therefrom (the moire position) on the left side thereof. The reason for this is that in the present embodiment, when the head of the viewer 2 is moved rightward in the drawing, the direction in which the head of the viewer 2 is moved and the direction in which the barrier of the shading barrier 10 is moved are opposite to each other. Consequently, the relationship between the liquid crystal shutters 31 and 32 and the image replacement in the present embodiment is shown in the following Table 1.

TABLE 1

| | leftward movement in drawing | | initial position | rightward movement in drawing | |
|---|---|---|---|---|---|
| | reversed view position | position spaced E/4-3E/4 apart | normal view position | position spaced E/4-3E/4 apart | reversed view position |
| liquid crystal shutter 31 | X | ○ | X | ○ | X |
| liquid crystal shutter 32 | ○ | X | ○ | X | ○ |
| image replacement | ○ | ○ | X | X | ○ |

In Table 1, ○ and x in the columns of the liquid crystal shutters 31 and 32 respectively indicate that they are on and off, and ○ and x in the column of image replacement respectively indicate the replacement of a left eye image and a right eye image and the initial state.

Moire is not viewed in switching the images on the LCD panel 20 by turning the liquid crystal shutters 31 and 32 on and off, whereby the viewer 2 can continuously view normal 3D images without having an uncomfortable feeling.

Figure 13:
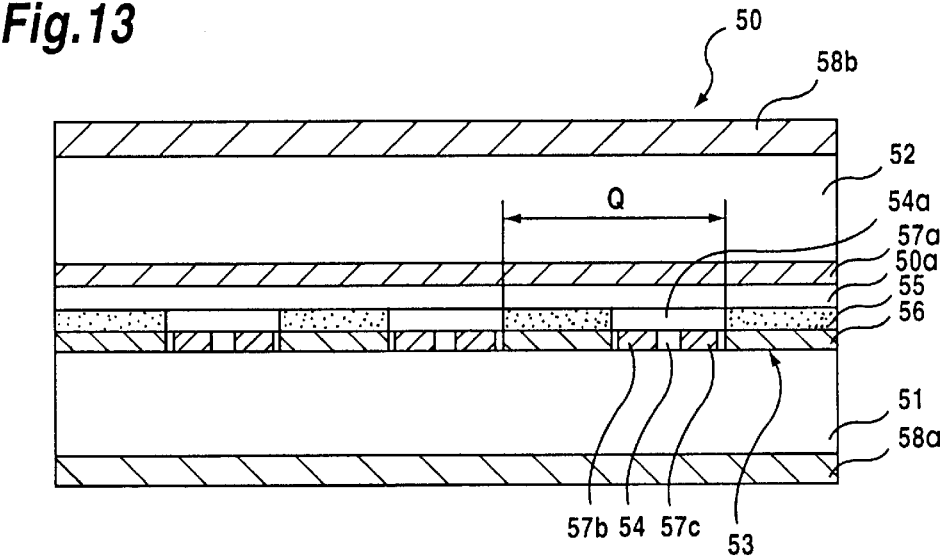
FIG. 13 is a typical sectional view of an LCD panel for shading in the present invention.

FIG. 13 illustrates the construction of an LCD panel for shading 50 which can be used as the shading barrier 10. The LCD panel for shading 50 is arranged between the LCD panel for image display 20 and the light source 30. Light from the light source 30 is converted into slit light by the LCD panel for shading 50. The slit light is divided into light corresponding to a left image signal and light corresponding to a right image signal after passing through the liquid crystal panel 20. The light corresponding to a left image signal and the light corresponding to a right image signal respectively enter the right eye 2L and the left eye 2R of the viewer 2.

The LCD panel 50 comprises a glass substrate 51 on the side of the light source 30, and a barrier film 53 arranged between the glass substrate 51 and a glass substrate 52 on the opposite side thereof and having longitudinal slits 54. Further, a polarizing plate on the incidence side 58a and a polarizing plate on the emission side 58b are respectively affixed to the glass substrate 51 and the glass substrate 52.

The barrier film 53 is composed of a member having a high index of reflection such as aluminum. Unnecessary light is reflected toward the light source 30 by the barrier film 53, to increase the utilization factor of the light. Further, a light absorbing film 55 composed of chromium oxide ($Cr_2O_3$), for example, is formed in a portion of the barrier film 53 on the opposite side of the light source 30, thereby to reduce the reflection of light incident from the opposite side of a back light.

The LCD panel 50 comprises transparent conductive films 57b and 57c composed of ITO (indium tin oxide), for example, formed in the shape of a stripe having a width which is one-fourth of the pitch Q between slits 54a in contact with the glass substrate 51 on the side of the light source 30 on both side of the barrier 56 of the barrier film 53, while comprising a transparent conductive film 57a composed of ITO, for example, formed over the entire surface of the other glass substrate 52 on the side of the back light. A liquid crystal layer 50a is provided between the transparent conductive film 57a and the transparent conductive films 57b and 57c.

The LCD panel 50 is driven in a normally opened state, and the slit 54 which always transmits light is formed between the transparent conductive films 57b and 57c in a stripe shape. The transparent conductive films 57b and 57c in a stripe shape are selectively driven, to drive a liquid crystal between the transparent conductive films 57b and 57c and the transparent conductive film 57a so that an opaque portion is formed. The switching of the driving of the transparent conductive films 57b and 57c causes the slit 54 of the barrier film 53 to be laterally moved by one-fourth of the pitch Q of the barrier film 53.

Consequently, the normal view position or the reversed view position of the LCD panel for image display 20 which is viewed by the viewer is moved to the crosstalk position, so that the right eye image and the left eye image can be replaced with each other without no uncomfortable feeling.

Figure 14:
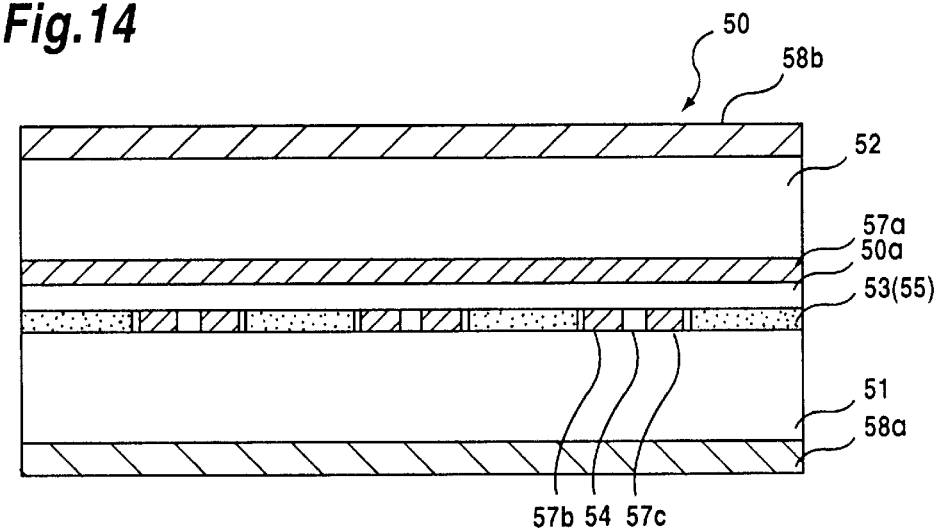
FIG. 14 is a typical sectional view of another LCD panel for shading in the present invention.

Another LCD panel for shading 50 shown in FIG. 14 is constructed similarly to the LCD panel 50 shown in FIG. 13 except that a barrier film 53 (55) is composed of a light absorbing film, and functions similarly to the LCD panel for shading 50 shown in FIG. 13 except that there is no function or effect of increasing the utilization factor by the reflection of light toward the light source 30.

Figure 15:
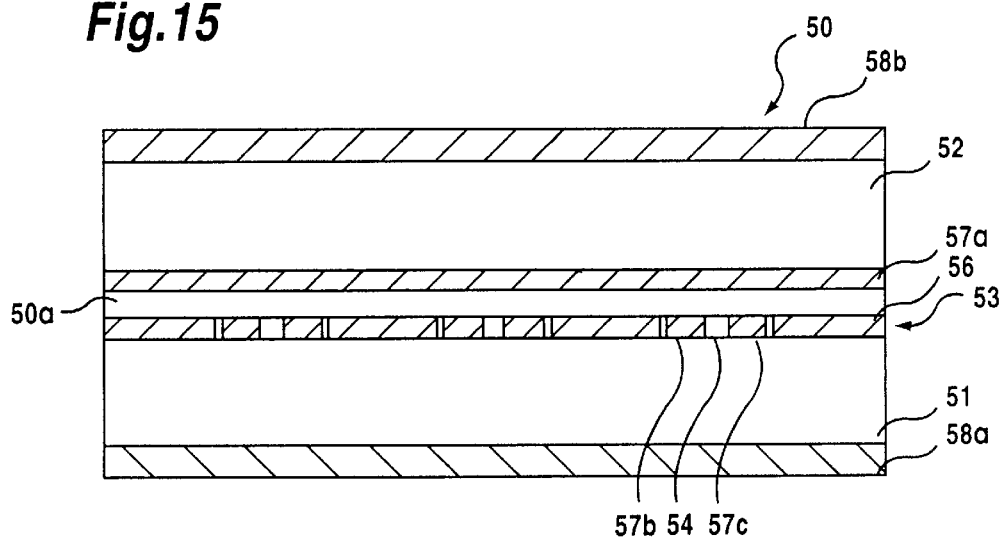
FIG. 15 is a typical sectional view of still another LCD panel for shading in the present invention.

Still another LCD panel for shading 50 shown in FIG. 15 is constructed similarly to the LCD panel for shading 50 shown in FIG. 14 except that a barrier 56 of a barrier film 53 is composed of a transparent electrode. Consequently, the same function or effect as that in the LCD panel for shading 50 shown in FIG. 14 is obtained. Further, the barrier 56 and transparent conductive films 57b and 57c are opened, to make the LCD panel 50 transparent throughout, so that display on an LCD panel for image display can be switched between display of 3D images and display of 2D images.

Figure 16:
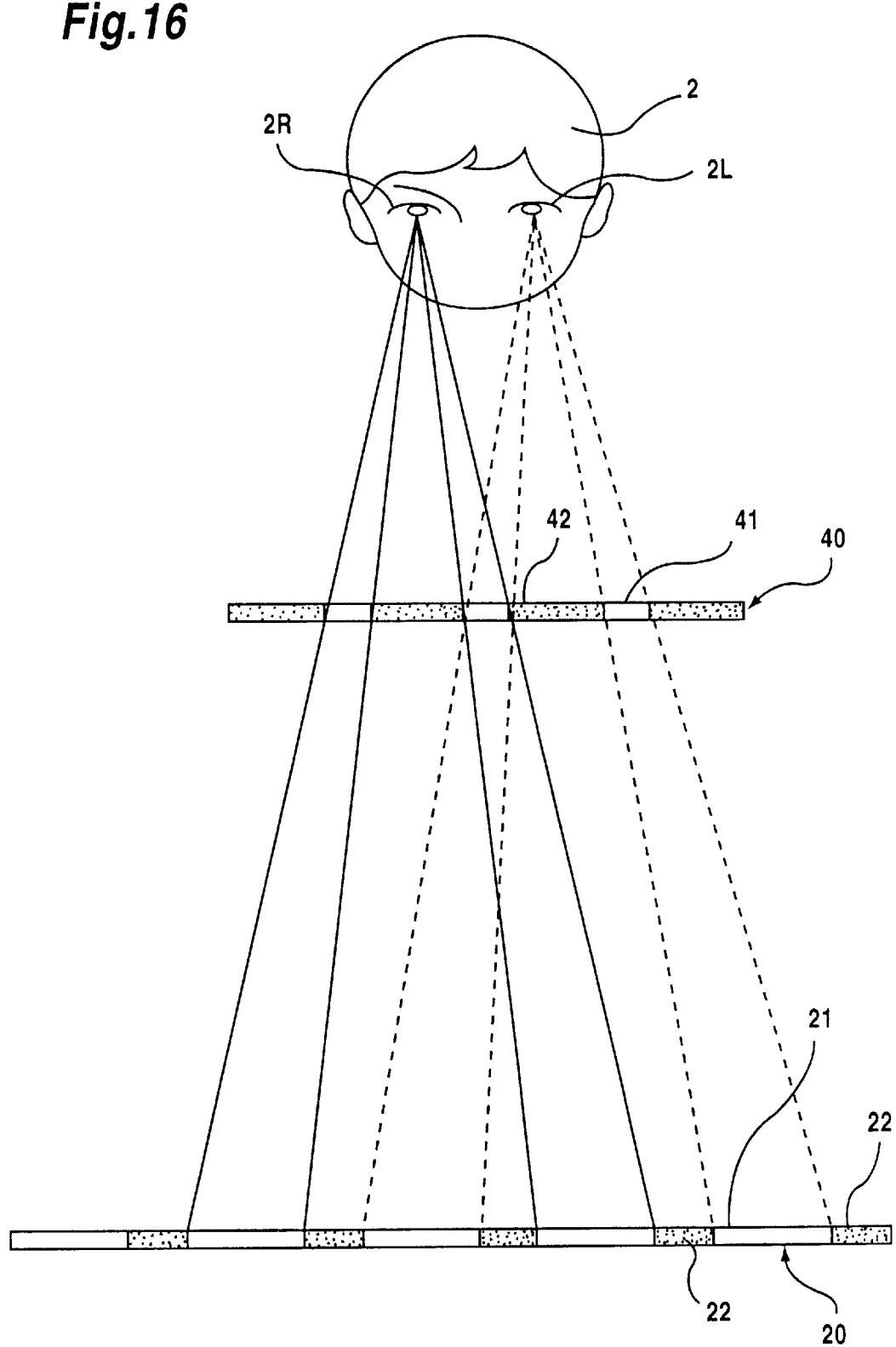
FIG. 16 is a typical view showing the principle of viewing 3D images in a normal view position in a second embodiment of the present invention.
Figure 17:
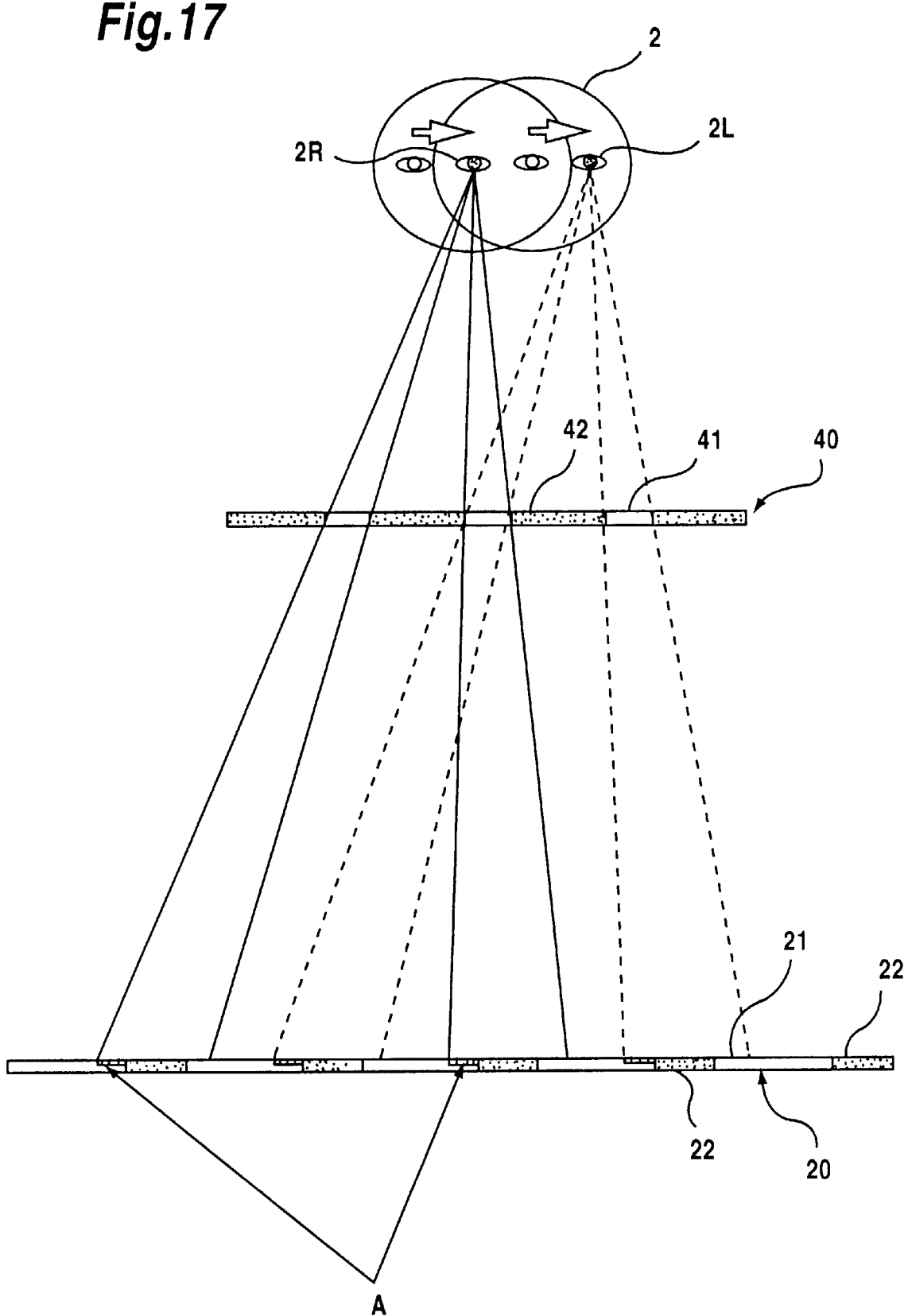
FIG. 17 is a typical view showing a principle indicating the positional relationship among the lines of sight in a position between a normal view position and a reversed view position, slits of a parallax barrier and pixels on an LCD panel.

In a 3D display device according to a second embodiment of the present invention, a parallax barrier 40 serving as a shading barrier is arranged on the side of a viewer as viewed from an LCD panel 20, as shown in FIG. 16. When the head of the viewer 2 is moved from the proper viewing position shown in FIG. 16 to a left moire position, as shown in FIG. 17, pixels 21 constituting a right eye image and a portion indicated by A of the pixels 21 constituting a left eye image with a black matrix portion 22 of the LCD panel 20 interposed therebetween are viewed with the right eye 2R of the viewer 2 through a slit 41 of the parallax barrier 40, whereby normal 3D images cannot be viewed.

Figure 18:
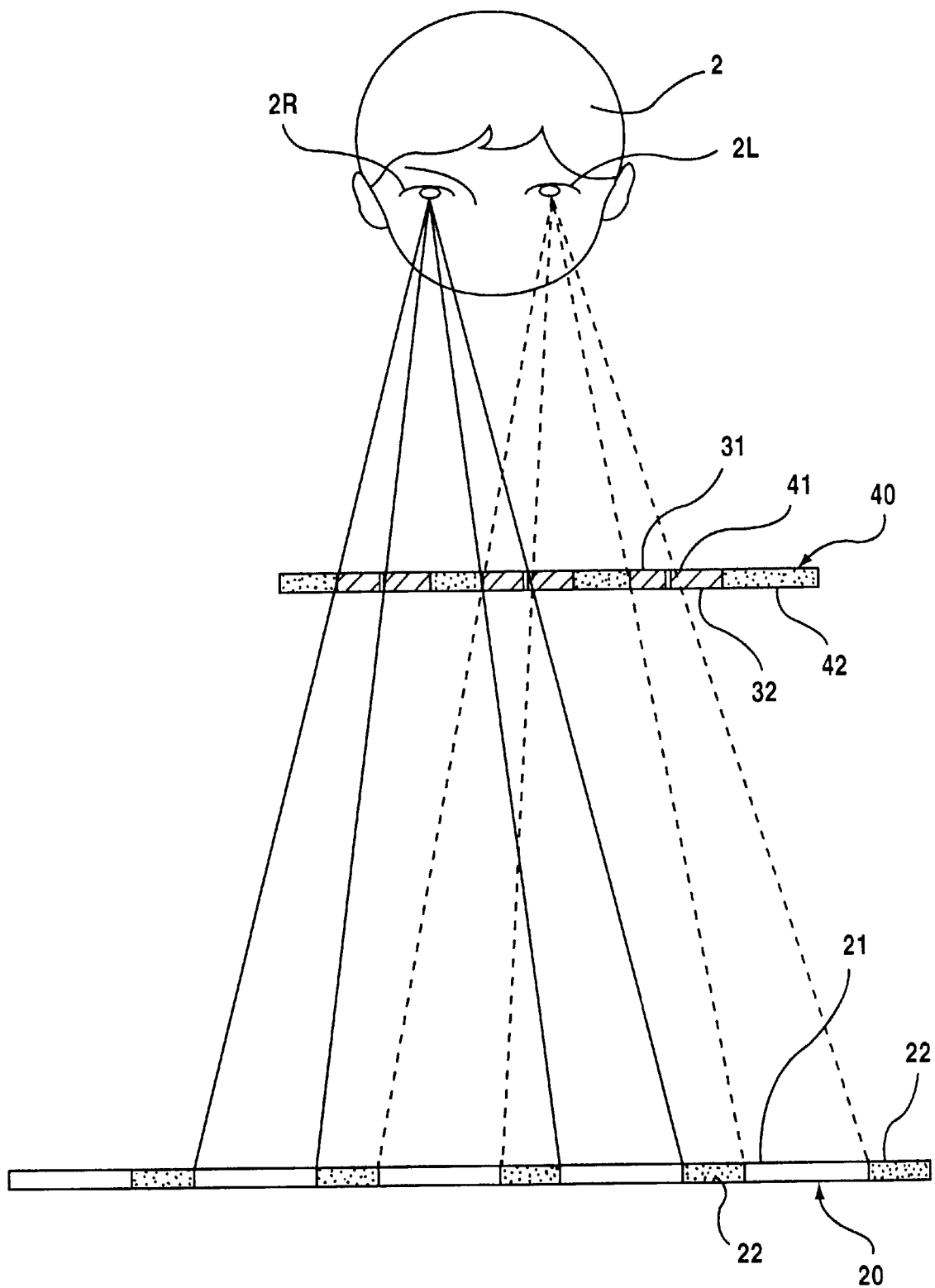
FIG. 18 is a typical view showing the principle of viewing 3D images in a normal view position in the second embodiment of the present invention.
Figure 19:
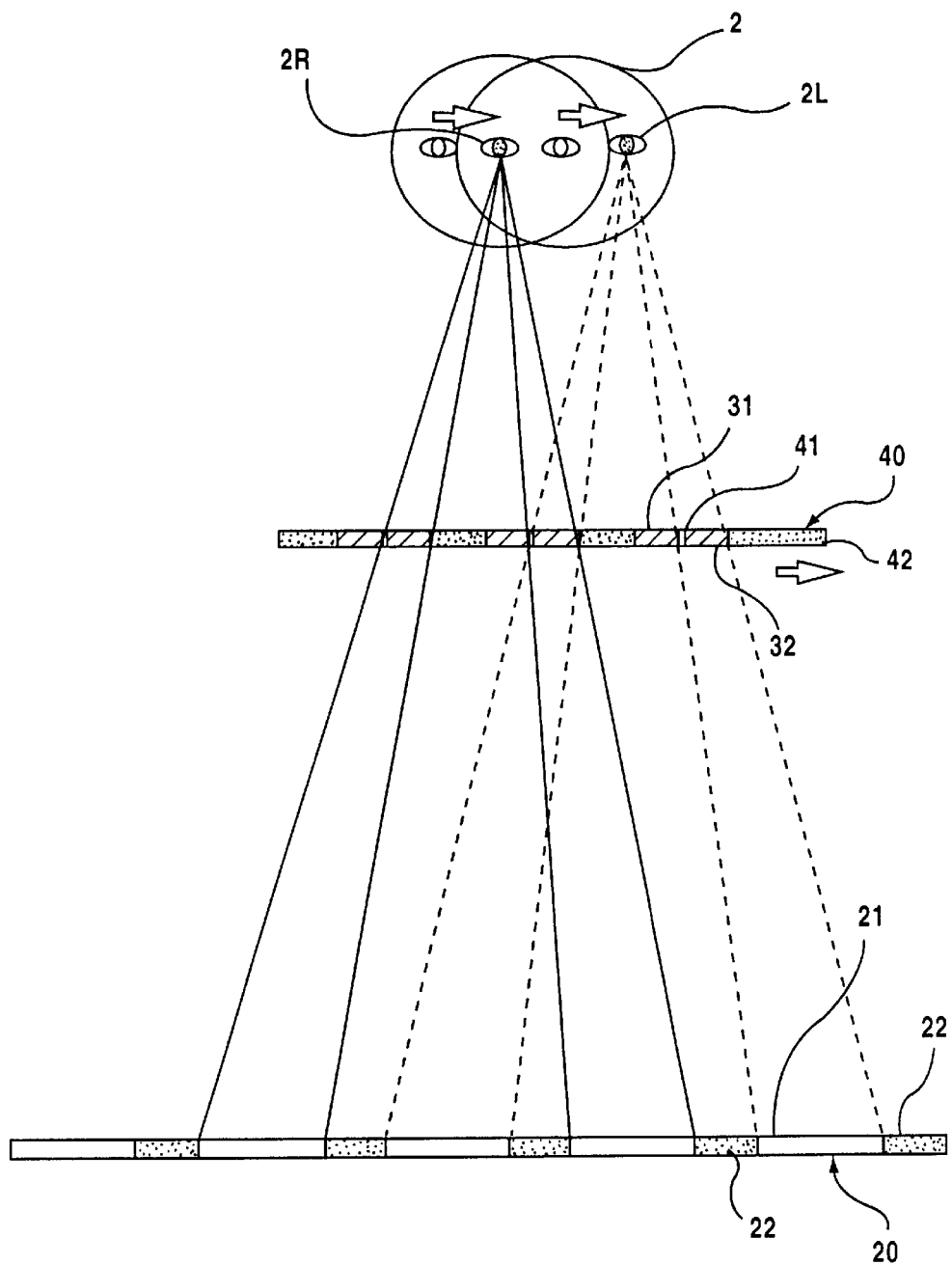
FIG. 19 is a typical view showing the principle of viewing 3D images in a region between a normal view position and a reversed view position in the second embodiment of the present invention.

As shown in FIGS. 18 and 19, liquid crystal shutters 31 and 32 are arranged in both left and right ends of the slit 41 of the parallax barrier 40, which are laterally reverse to those in the first embodiment. As shown in FIG. 19, when the slit 41 of the parallax barrier 40 is moved by turning the liquid crystal shutter 31 on the left side on and turning the liquid crystal shutter 32 on the right side off, light for the pixels 21 constituting the right eye image can be incident on the right eye 2R of the viewer 2, for example.

When the head of the viewer 2 is returned to the proper viewing position, or is further moved to a left reversed view position, light for the pixels 21 constituting the right eye image can be incident on the right eye 2R of the viewer 2, for example, by turning the liquid crystal shutter on the left side 31 off and turning the liquid crystal shutter on the right side 32 on. When the head of the viewer 2 is moved to the reversed view position, the viewer 2 can view normal 3D images by replacing the right eye image and the left eye image on the LCD panel 20.

The other construction, function and effect of the present embodiment are the same as those of the first embodiment and hence, the description thereof is not repeated in order to avoid the overlapping.

It goes without saying that the above-mentioned LCD panel for shading 50 shown in FIGS. 14 and 15 can be employed as the parallax barrier 40.

Description is now made of a third embodiment of the present invention. The third embodiment is for enlarging the range in which 3D images can be viewed with respect to forward or backward movement and leftward or rightward movement of a viewer.

Figure 20:
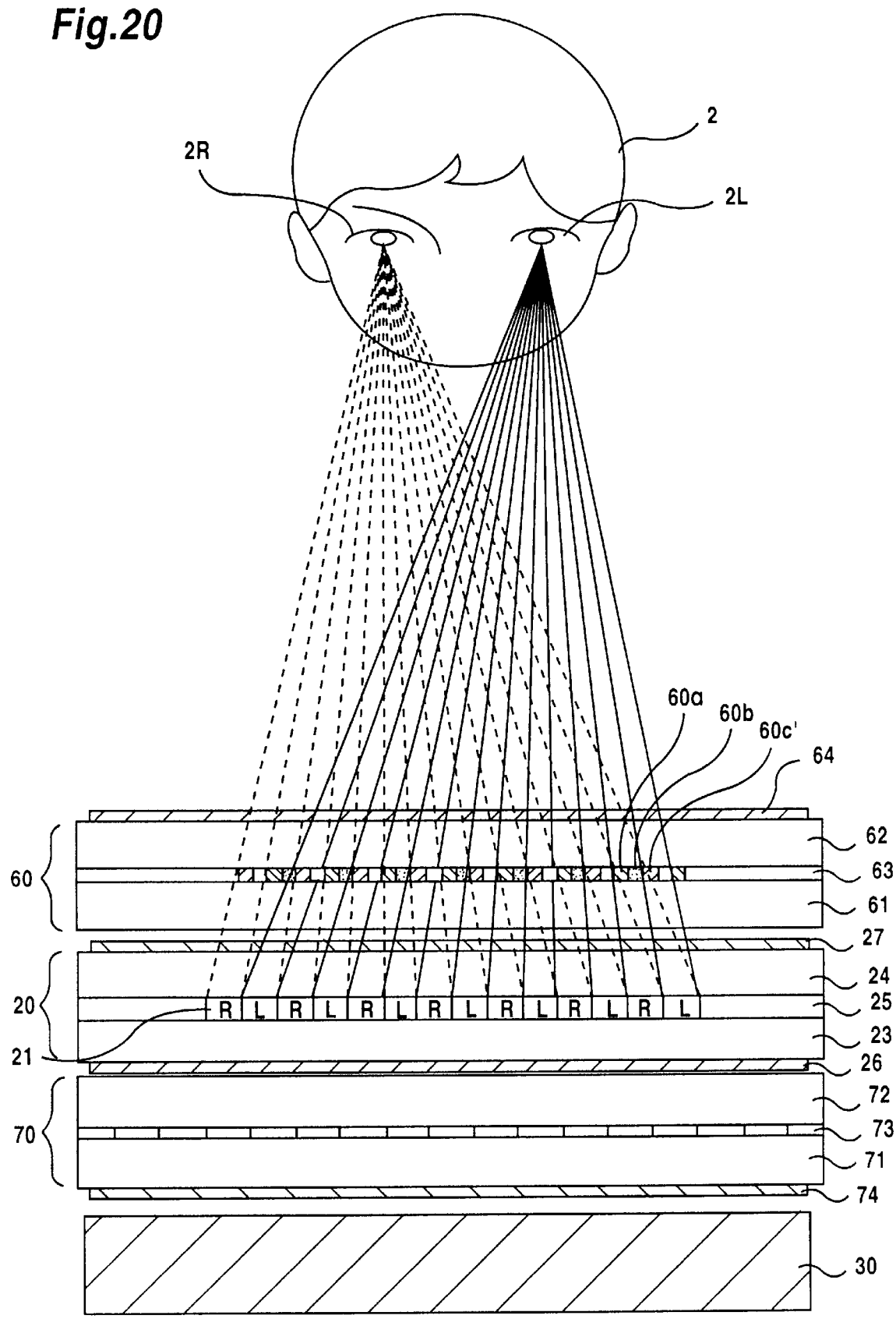
FIG. 20 is a typical view showing the principle of viewing 3D images in a normal view position at the time of long-distance viewing in a third embodiment of the present invention.
Figure 21:
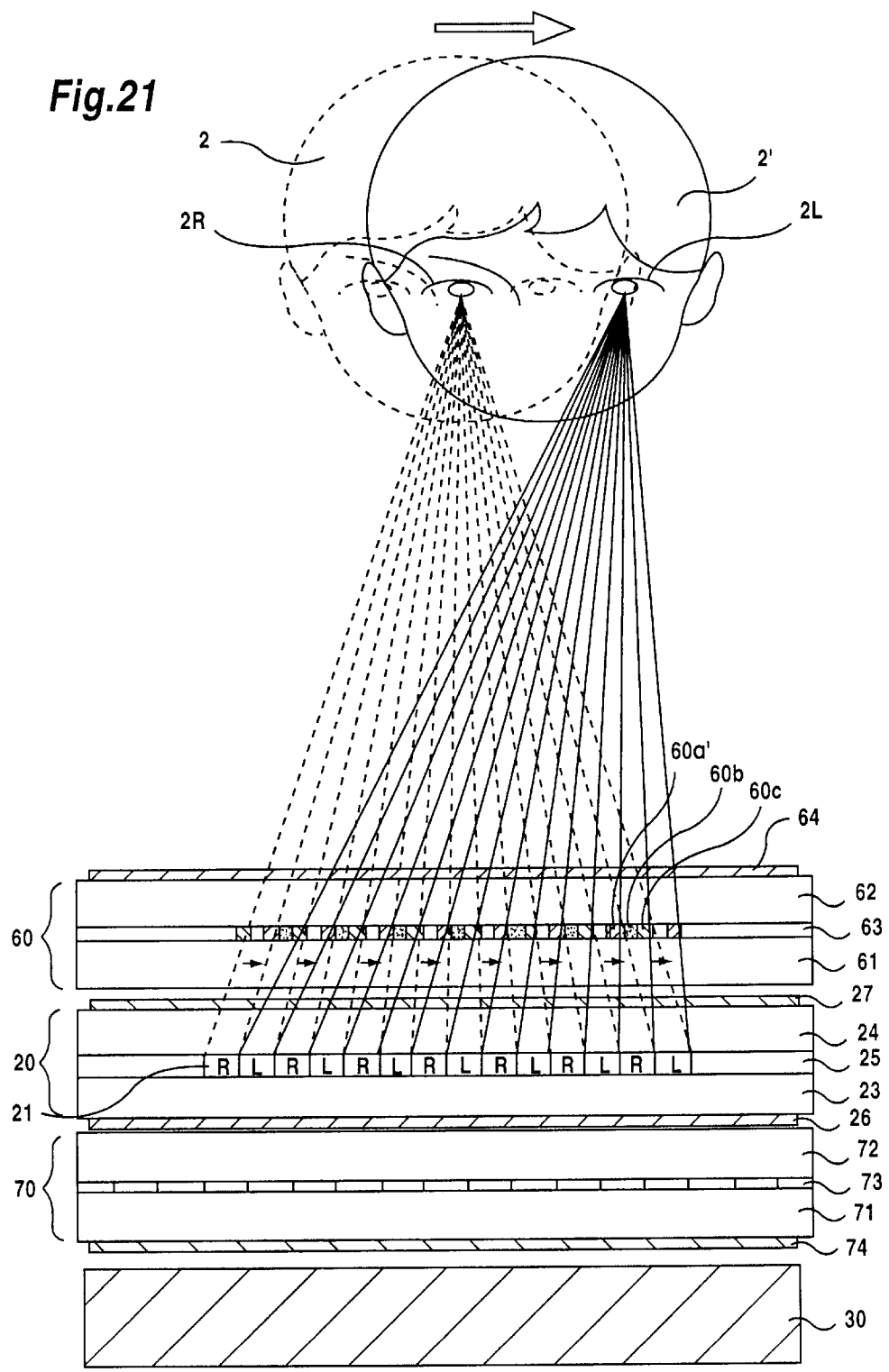
FIG. 21 is a typical view showing the principle of viewing 3D images in a moire position at the time of long-distance viewing in the third embodiment of the present invention.
Figure 22:
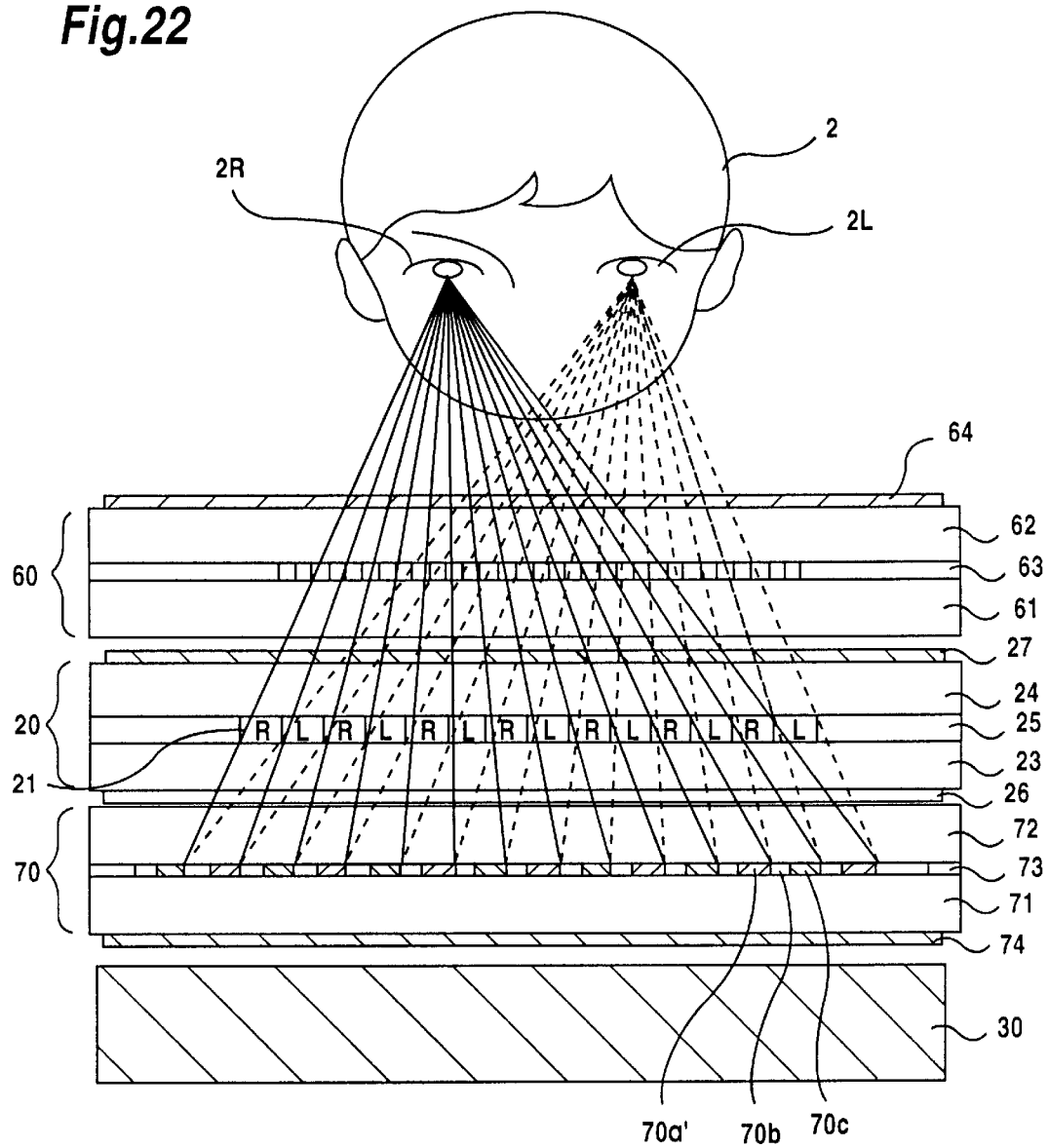
FIG. 22 is a typical view showing the principle of viewing 3D images in a normal view position at the time of short-distance viewing in the third embodiment of the present invention.
Figure 23:
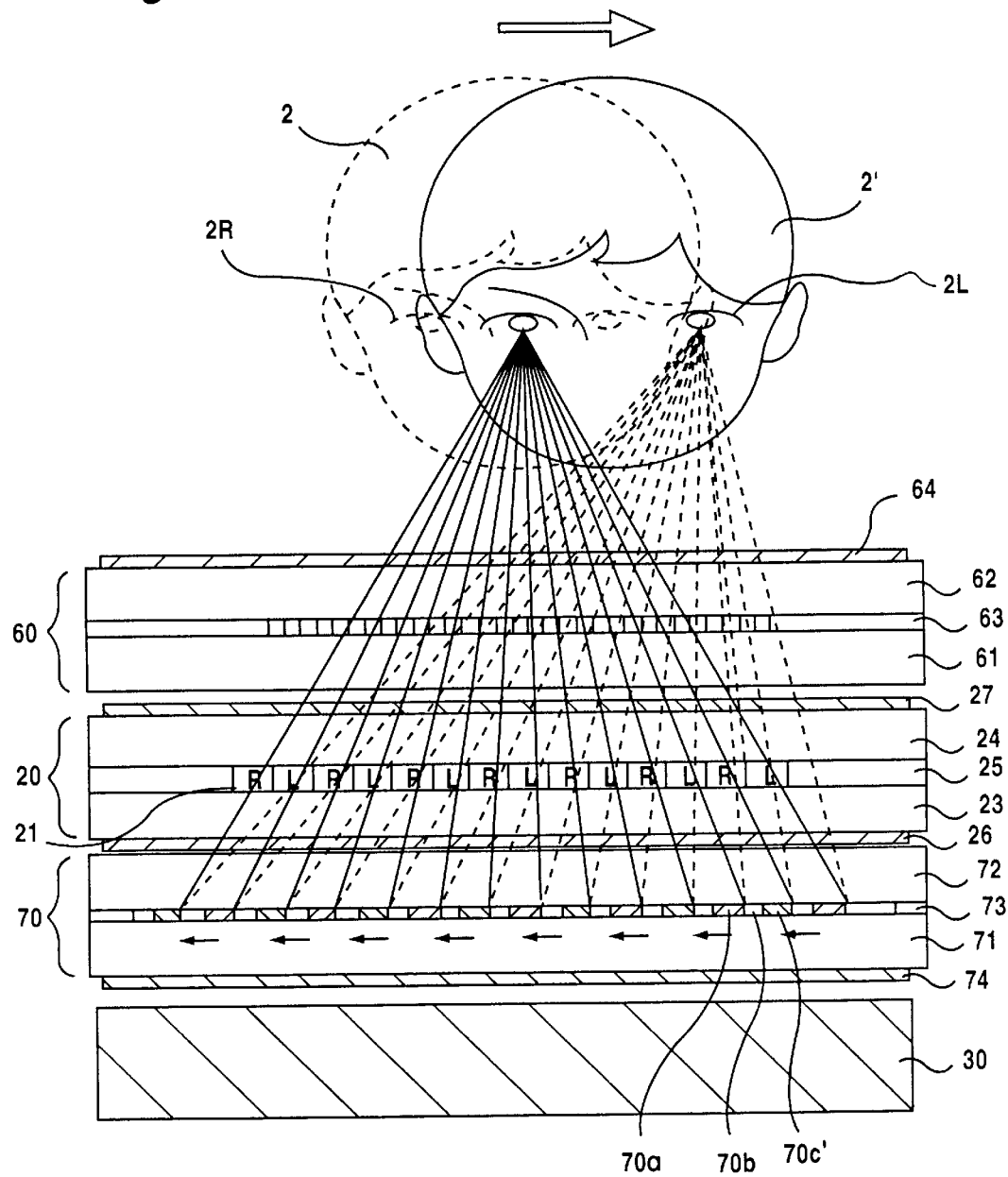
FIG. 23 is a typical view showing the principle of viewing 3D images in a moire position at the time of short-distance viewing in the third embodiment of the present invention.
Figure 24:
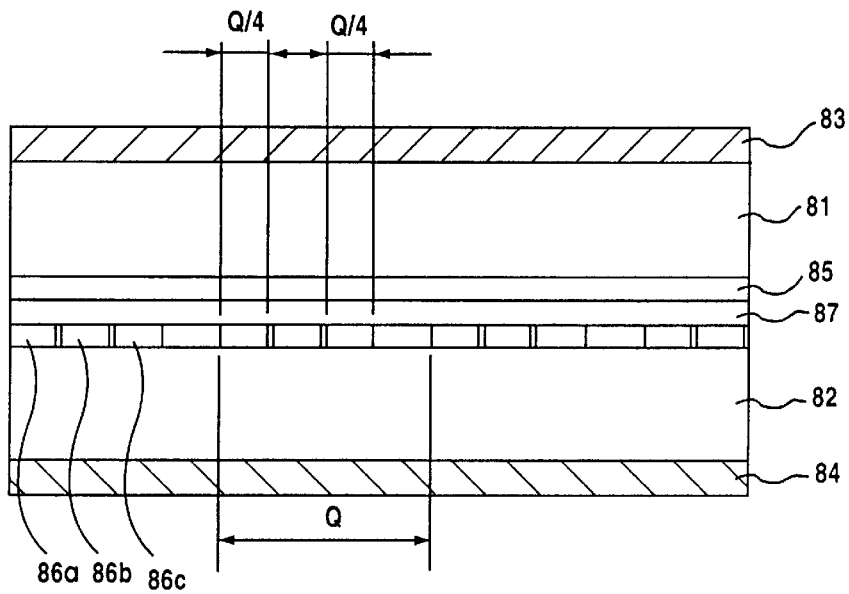
FIG. 24 is a typical sectional view of an LCD panel for shading in the third embodiment of the present invention.
Figure 25:
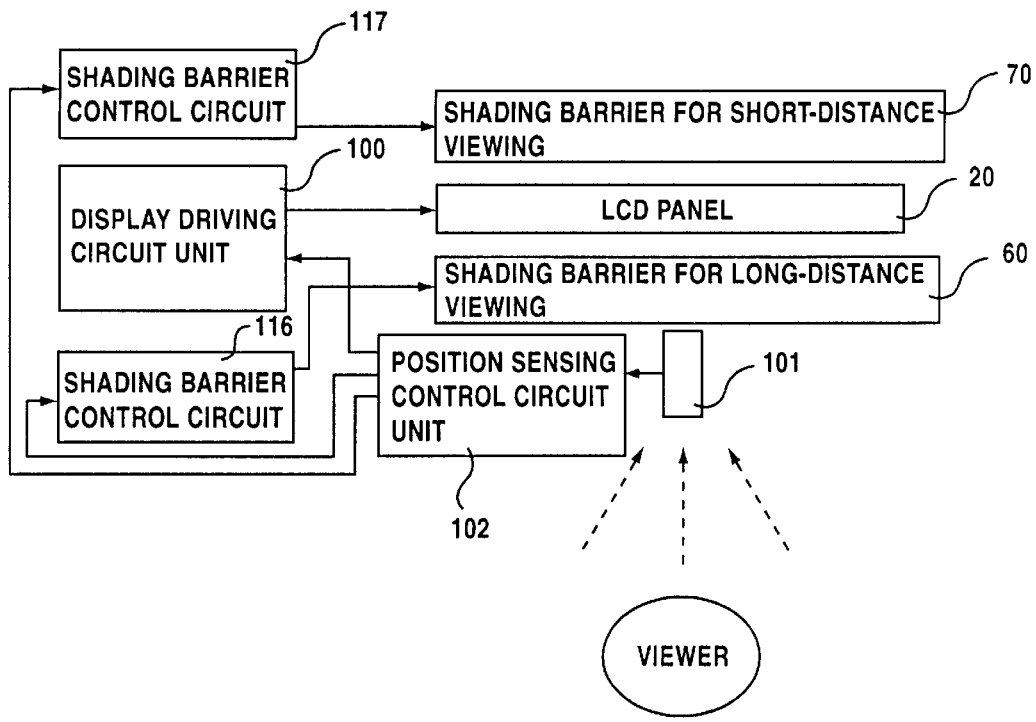
FIG. 25 is a block diagram showing the construction of a 3D display device according to the third embodiment of the present invention.
Figure 26:
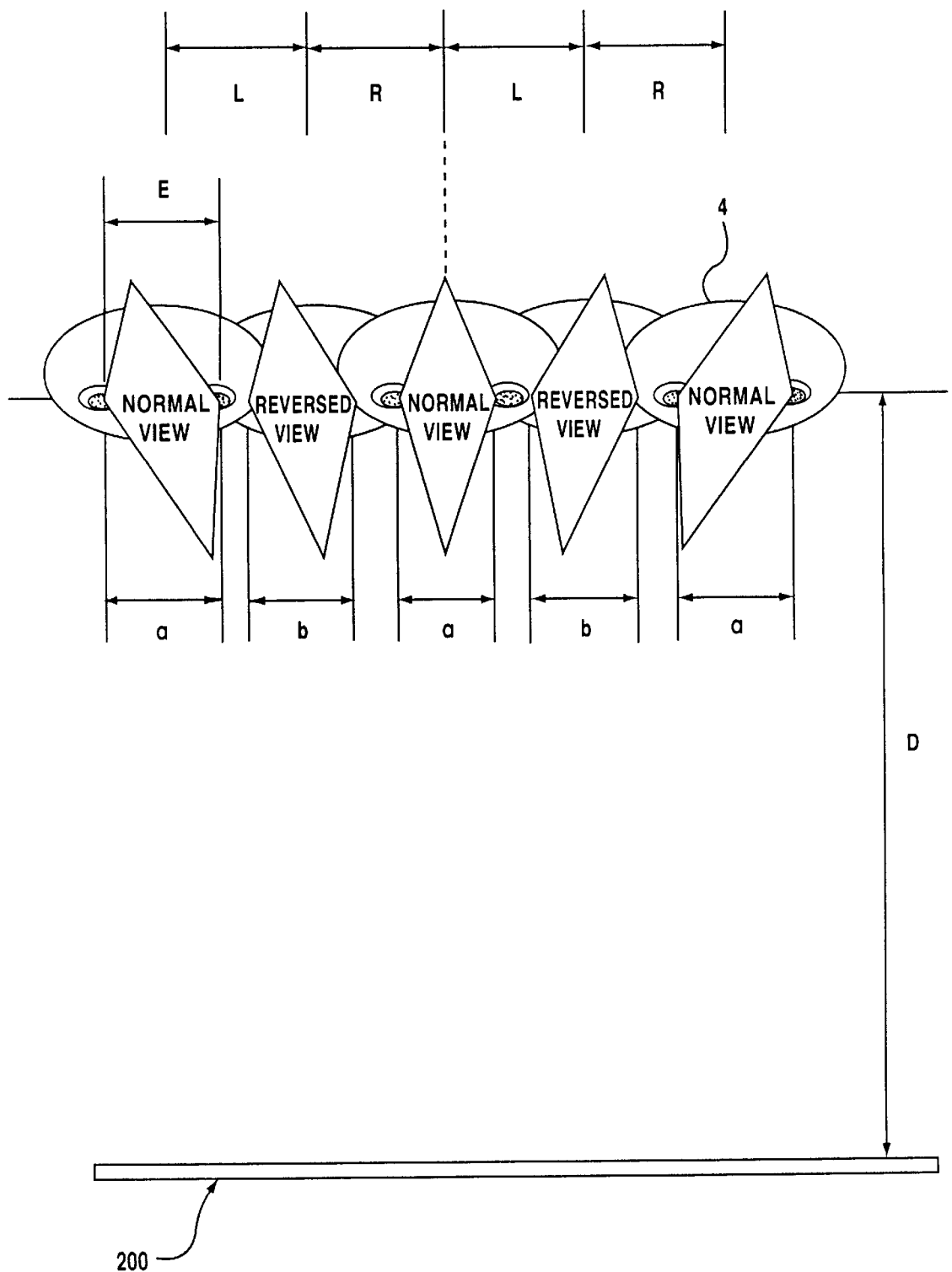
FIG. 26 is a typical view showing the principle of viewing 3D images in a conventional example.
Figure 27:
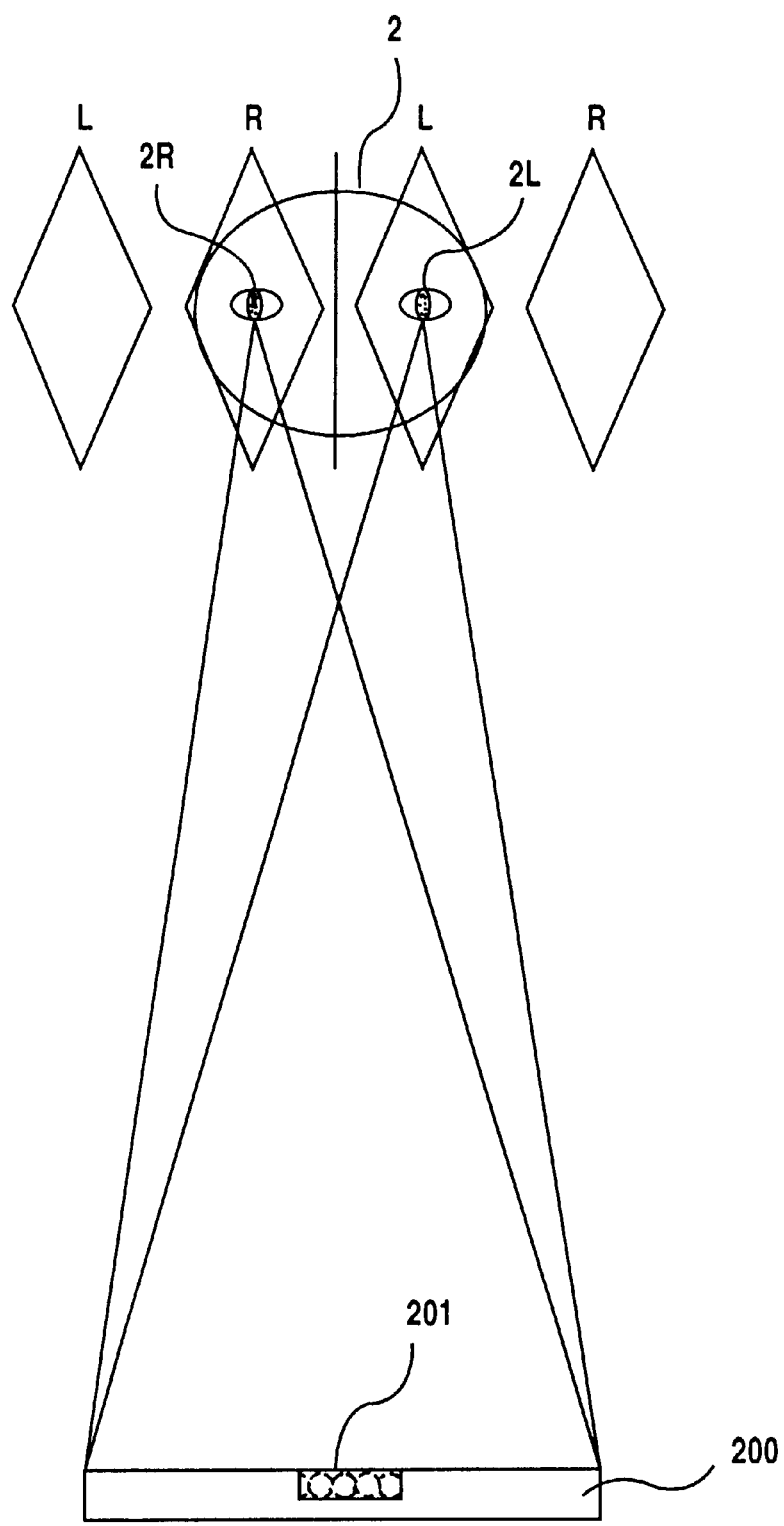
FIG. 27 is a typical view showing the principle of viewing 3D images in a normal view position in the other conventional example.
Figure 28:
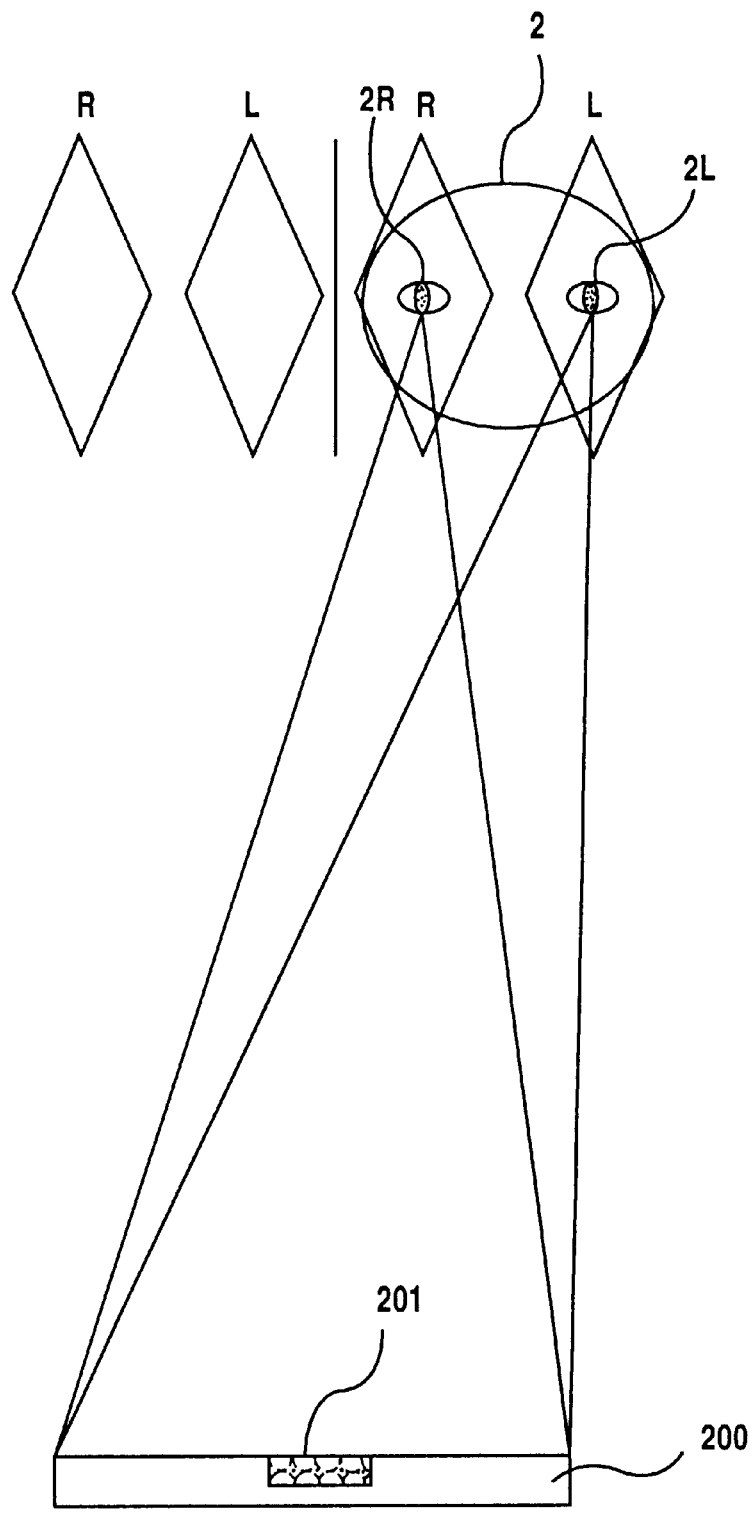
FIG. 28 is a typical view showing the principle of viewing 3D images in a reversed view position in the other conventional example.
Figure 29:
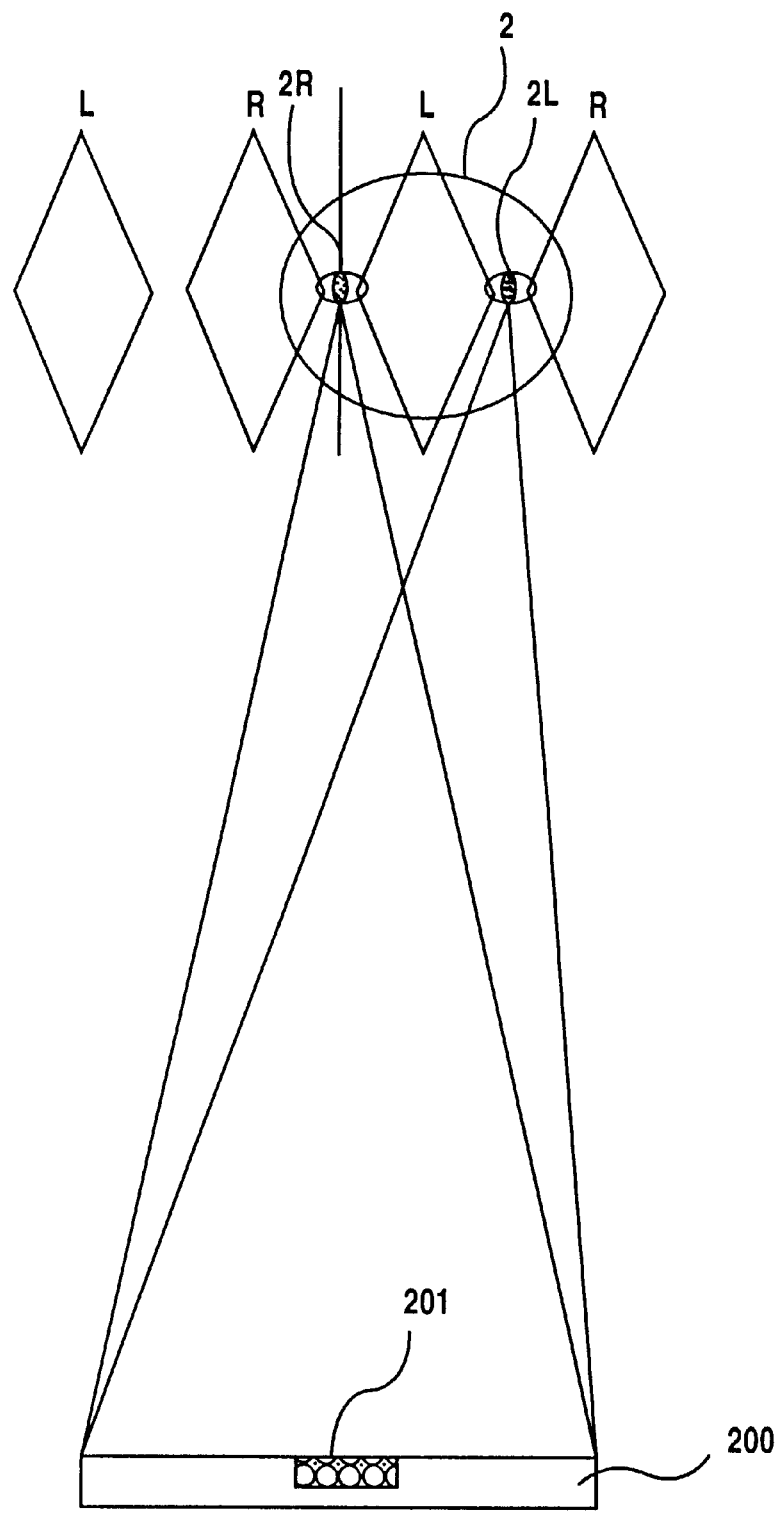
FIG. 29 is a typical view showing the principle of viewing in a crosstalk position in the other conventional example.

FIGS. 20 and 21 are plan views showing a long-distance viewing state in the third embodiment of the present invention, FIGS. 22 and 23 are plan views showing a short-distance viewing state in the third embodiment of the present invention, FIG. 24 is a cross-sectional view showing the construction of a shading barrier used in the third embodiment of the present invention, and FIG. 25 is a block diagram showing the construction of a 3D display device according to the present invention.

In the 3D display device according to the present invention, a shading barrier on the light emission side 60 and a shading barrier on the light incidence side 70 are respectively arranged on the side of a viewer 2 and between a plane light source 30 and an LCD panel 20 with the LCD panel 20 interposed therebetween. The two shading barriers 60 and 70 are so constructed that barriers can be turned on and off (appear and disappear), as described later. In the present embodiment, a TN (Twisted Nematic)-type LCD panel is employed as the shading barriers 60 and 70.

The shading barriers 60 and 70 are so arranged that the distance between the barrier of the shading barrier 60 and the LCD panel 20 and the distance between the barrier of the shading barrier 70 and the LCD panel 20 differ from each other, and are so constructed that the proper viewing distance between the viewer 2 and the LCD panel 20 varies. In the present embodiment, the shading barrier 60 is for long-distance viewing, and the shading barrier 70 is for short-distance viewing.

The LCD panel 20 comprises a glass substrate on the light incidence side 23, a glass substrate on the light emission side 24, a liquid crystal layer 25 provided between the substrates 23 and 24, a polarizing plate on the light incidence side 26 which is affixed to the glass substrate on the light incidence side 23, and a polarizing plate on the light emission side 27 which is affixed to the glass substrate on the light emission side 24. The LCD panel 20 is driven by a matrix driving system, for example. A voltage is applied to a transparent pixel electrode (not shown) depending on an image signal so that an image is displayed on the LCD panel 20. A right eye image R and a left eye image L are alternately displayed every other longitudinal line by processing image signals supplied to the LCD panel 20.

In the shading barrier 60 composed of the TN-type LCD panel arranged on the light emission side of the LCD panel 20, a liquid crystal layer 63 is provided between two glass substrates 61 and 62, and a polarizing plate on the light emission side 64 is provided on the side of the viewer 2. Further, the polarizing plate 27 of the LCD panel 20 on which images are formed is also used as a polarizing plate on the light incidence side of the shading barrier 60. The shading barrier 60 composed of the TN-type LCD panel is so constructed that a transparent electrode composed of ITO or the like is patterned on the inner surfaces of the glass substrates 61 and 62, so that the barrier can be electrically turned on and off. Further, the shading barrier 60 has a function of moving the barrier by one-fourth of its pitch (Q) in correspondence to the position of the head of the viewer 2. For example, in order to realize the function, the transparent electrode for tuning the barrier on and off is subdivided, to make the movement of the barrier possible. The barrier is so turned on that one slit corresponds to two pixels displayed on the LCD panel 20. Light passing through the LCD panel 20 is divided into light for left eye and light for right eye, so that the light for left eye and the light for right eye respectively enter the left eye 2L and the right eye 2R of the viewer 2.

On the other hand, in the shading barrier 70 composed of the TN-type LCD panel arranged on the light incidence side of the LCD panel 20, a liquid crystal layer 73 is provided between two LCD panels 71 and 72, and a polarizing plate on the light incidence side 74 is provided on the side of the light source 30. Further, the polarizing plate 26 of the LCD panel 20 on which images are formed is also used as a polarizing plate on the light emission side of the TN-type liquid crystal panel. The shading barrier 70 composed of the TN-type LCD panel is so constructed that a transparent electrode composed of ITO or the like is patterned on the inner surfaces of the glass substrates 71 and 72, so that the barrier is electrically turned on and off. Further, the shading barrier 70 has a function of moving the barrier by one-fourth of its pitch (Q) in correspondence to the position of the head of the viewer 2, similarly to the above-mentioned shading barrier 60. For example, in order to realize the function, the transparent electrode for tuning the barrier on and off is subdivided, to make the movement of the barrier possible. The barrier is so turned on that one slit corresponds to two pixels displayed on the LCD panel 20. Light passing through the LCD panel 20 is divided into light for left eye and light for right eye, so that the light for left eye and the light for right eye respectively enter the left eye 2L and the right eye 2R of the viewer 2.

When the viewer 2 is in a long-distance viewing position, the TN-type LCD panel is brought into its on state so that the barrier of the shading barrier for long-distance 60 is electrically turned on, and the TN-type LCD panel is brought into its off state so that the barrier of the shading barrier for short-distance 70 is electrically turned off, as shown in FIGS. 20 and 21. On the other hand, when the viewer 2 is in a short-distance viewing position, the TN-type LCD panel is brought into its on state so that the barrier of the shading barrier for short-distance 70 is electrically turned on, and the TN-type LCD panel is brought into its off state so that the barrier of the shading barrier for long-distance 60 is electrically turned off, as shown in FIGS. 22 and 23.

FIG. 24 illustrates a specific example of the TN-type LCD panel used for the shading barriers 60 and 70. Since the TN-type LCD panel can be adapted to both of the shading barriers 60 and 70, components thereof shall be assigned different numbers from those of the shading barriers 60 and 70.

In the LCD panel, a liquid crystal layer 87 is provided between two glass substrates 81 and 82. Polarizing plates 83 and 84 are respectively provided on the outer surfaces of the glass substrates 81 and 82. The polarizing plate on the side of the liquid crystal panel 20 on which images are displayed out of the two polarizing plates 83 and 84 can be shared with the LCD panel 20. In FIGS. 20 to 23, the shading barrier and the LCD panel for image display 20 share a polarizing plate. A transparent electrode 85 is formed over the inner surface of the glass substrate 81. The transparent electrode 85 is composed of ITO, for example. Stripe-shaped transparent electrodes 86a, 86b and 86c are provided on the inner surface of the glass substrate 82. The liquid crystal layer 87 is provided between the transparent electrode 85 and the transparent electrodes 86a, 86b and 86c. The stripe-shaped transparent electrodes 86a, 86b and 86c are so designed at a pitch Q that one pair of transparent electrodes out of the three transparent electrodes 86a, 86b and 86c corresponds to two pixels on the LCD panel 20 in order to make it possible to view 3D images without using glasses when the barrier is on. The transparent electrodes 86a, 86b and 86c out of the transparent electrodes are for making the movement of the barrier possible, and any one of the transparent electrodes 86a, 86b and 86c is turned on in correspondence to the position of the head of the viewer 2. As shown in FIG. 24, the widths of the transparent electrodes 86a and 86c are respectively set to Q/4. Therefore, the movement of the barrier corresponding to Q/4 is possible by switching the transparent electrode between its on and off states. Further, the barrier on the entire surface can be also turned off by turning all the transparent electrodes 86a, 86b and 86c off.

FIG. 25 is a block diagram showing the construction of the 3D display device according to the present invention.

An output from a sensor 101 for sensing the position of a viewer viewing 3D images displayed on the LCD panel 20 is fed to a position sensing control circuit unit 102. The position sensing control circuit unit 102 senses whether the viewer is in a short-distance viewing position or a long-distance viewing position by the output of the sensor 101, and respectively feeds information relating to the position to shading barrier control circuit units 116 and 117. Further, the position sensing control circuit unit 102 senses whether the head of the viewer is in a normal view position, a position spaced E/4 to 3E/4 apart from the normal view position (a moire position) or a reversed view position by the output of the sensor 101, and feeds a control signal corresponding to the position to a display driving circuit unit 100.

The display driving circuit unit 100 respectively generates a left eye image signal and a right eye image signal to be fed to the LCD panel 20, and feeds the image signals to the LCD panel 20. The display driving circuit unit 100 feeds the image signals so as to display a left eye image and a right eye image on the LCD panel 20 on the basis of the output from the position sensing control circuit unit 102, as shown in FIGS. 21 to 23, when the head of the viewer is in the normal view position, while feeding image signals to be fed to the LCD panel 20 upon switching the left eye image and the right eye image on the LCD panel 20 on the basis of the output from the position sensing control circuit unit 102 when the head of the viewer is in the reversed view position.

Furthermore, the shading barrier control circuit units 116 and 117 carry out such control as to use the shading barrier for short-distance viewing 70 when the viewer is in the short-distance viewing position, while using the shading barrier for long-distance viewing 60 when the viewer is in the long-distance viewing position depending on the output from the position sensing control circuit unit 102.

Specifically, when the viewer 2 is in the long-distance viewing position, the TN-type LCD panel serving as the shading barrier for long-distance viewing 60 is brought into its on state so that the barrier of the TN-type LCD panel is electrically turned on, as shown in FIGS. 20 and 21. In the present embodiment, the 3D display device is so constructed that the barrier is formed when the LCD panel is brought into the on state. Consequently, the shading barrier control circuit unit 116 applies a voltage to the TN-type LCD panel, to form the barrier of the shading barrier 60.

On the other hand, the TN-type LCD panel serving as the shading barrier for short-distance viewing 70 is brought into its off state so that the barrier of the shading barrier 70 is electrically turned off. Consequently, the shading barrier control circuit unit 117 stops the supply of a voltage to the TN-type LCD panel, to bring the shading barrier 70 into its transparent state.

As described in the foregoing, the shading barrier on the light emission side 60 of the LCD panel 20 is brought into the on state, and the shading barrier on the light incidence side 70 is brought into the off state, whereby the viewer 2 can view 3D images at a long viewing distance as illustrated by the function of the shading barrier on the light emission side 60.

Consider a case where the viewer 2 is in the normal view position as shown in FIG. 20. Letting regions where barriers are turned on and off by ITO electrode patterns 86a, 86b and 86c be a region a, a region b and a region c, respectively, the barriers in the regions a and b enter on states 60a and 60b, and the barrier in the region c enters an off state 60c'. At this time, the viewer can view 3D images right in front of the screen, as shown in FIG. 20.

When the sensor 101 senses that the head of the viewer 2 is slightly moved rightward in the drawing, so that the head of the viewer 2 is moved from the normal view position to the position spaced E/4 to 3E/4 apart therefrom, i.e., the moire position, as shown in FIG. 21, the shading barrier control circuit unit 116 controls the shading barrier 60 so as to move the barrier by Q/4 in the same direction as the direction in which the head of the viewer 2 is moved. That is, the barrier in the region a enters an off state 60a', and the barriers in the regions b and c enter on states 60b and 60c, as described above. Consequently, the barrier becomes identical to that in a case where it is moved rightward by Q/4 from the initial state. At this time, normal 3D images can be viewed in the moire position, as shown in FIG. 21.

When the head of the viewer 2 is moved to a moire position in the opposite direction to that shown in FIG. 21, the barrier in the region a and the barriers in the regions b and c may be respectively brought into an off state 60a' and on states 60b and 60c, and the right eye image and the left eye image which are alternately displayed on the LCD panel 20 may be replaced with each other. That is, R and L in the drawing may be replaced with each other. Consequently, normal 3D images can be viewed even in the moire position in the opposite direction to that shown in FIG. 21.

The movement of the shading barrier 60 and the switching of display on the LCD panel 20 with respect to the movement of the head of the viewer 2 are as shown in Table 2 and Table 3. Table 2 shows a case where the viewer 2 is moved leftward in the drawing from the reference normal view position, where the head of the viewer 2 is moved from the reference normal view position to a moire position (1), a reversed view position and a moire position (2). Table 3 shows a case where the viewer 2 is moved rightward in the drawing from the reference normal view position, where the head of the viewer 2 is moved from the reference normal view position to a moire position (3), a reversed view position and a moire position (4).

The movement of the shading barrier 60 and the switching of display on the LCD panel 20 are performed with respect to the movement of the viewer 2 from a plurality of normal view positions which exist at the proper viewing distance in long-distance viewing, whereby a complete 3D image can be viewed from all positions at the proper viewing distance. The movement of the shading barrier 60 and the switching of display on the LCD panel 20 may be similarly performed with respect to the movement from the respective normal view positions.

According to the present embodiment, it is possible to enlarge the range in which 3D images are viewed with respect to the lateral movement at the time of long-distance viewing.

TABLE 2

| movement of viewer | leftward in drawing from normal view position | | | reference normal |
|---|---|---|---|---|
| 3D viewing state | moire position(2) | reversed view position | moire position(1) | view position |
| barrier a | X | ◯ | X | ◯ |
| barrier b | ◯ | ◯ | ◯ | ◯ |
| barrier c | ◯ | X | ◯ | X |
| image replacement | X | ◯ | ◯ | X |

TABLE 3

| movement of viewer | reference normal | rightward in drawing from normal view position | | |
|---|---|---|---|---|
| 3D viewing state | view position | moire position(3) | reversed view position | moire position(4) |
| barrier a | ◯ | X | ◯ | ◯ |
| barrier b | ◯ | ◯ | ◯ | ◯ |
| barrier c | X | ◯ | X | ◯ |
| image replacement | X | X | ◯ | ◯ |

In Table 2 and Table 3, ◯ and x in the columns of the barriers a, b and c respectively indicate that they are on and off, and ◯ and x in the column of image replacement respectively indicate the replacement of a left eye image and a right eye image and the initial state.

When the viewer 2 is in the short-distance viewing position, the shading barrier control circuit unit 117 then carries out such control that the TN-type LCD panel composing the shading barrier 70 is turned on, to bring the shading barrier 70 into its on state, as shown in FIG. 22. Consequently, the shading barrier control circuit unit 117 applies a voltage to the TN-type LCD panel, to form the barrier of the shading barrier 70.

On the other hand, the TN-type LCD panel serving as the shading barrier for long-distance viewing 60 is brought into its off state so that the barrier of the shading barrier 60 is electrically turned off, to bring the LCD panel to its transparent state. Consequently, the shading barrier control circuit unit 116 stops the supply of a voltage to the TN-type LCD panel, to bring the shading barrier 60 into its transparent state.

As described in the foregoing, the shading barrier on the light incidence side 70 of the LCD panel 20 is brought into the on state, and the shading barrier on the light emission side 60 is brought into the off state, whereby the viewer 2 can view 3D images at a short viewing distance as illustrated by the function of the shading barrier on the light incidence side 70.

Consider a case where the viewer 2 is in the normal view position as shown in FIG. 22. Letting regions where barriers are turned on and off by ITO electrode patterns 86a, 86b and 86c be a region a, a region b and a region c, respectively, the barriers in the regions b and c enter on states 70b and 70c, and the barrier in the region a enters an off state 70a'. At this time, the viewer can view 3D images right in front of the screen, as shown in FIG. 22.

When the sensor 101 senses that the head of the viewer 2 is slightly moved rightward in the drawing, so that the right eye is moved from the normal view position to the position spaced E/4 to 3E/4 apart therefrom, i.e., the moire position, as shown in FIG. 23, the shading barrier control circuit unit 117 moves the barrier of the shading barrier 70 by Q/4 in a direction opposite to the direction in which the head of the viewer 2 is moved. That is, the barrier in the region c enters an off state 70c', and the barriers in the regions a and b enter on states 70a and 70b. Consequently, the barrier becomes identical to that in a case where it is moved in the opposite direction by Q/4 from the initial state. At this time, normal 3D images can be viewed in the moire position, as shown in FIG. 23.

When the head of the viewer 2 is moved to a moire position in the opposite direction to that shown in FIG. 23, the barrier in the region c and the barriers in the regions a and b may be similarly brought into an off state 70c' and on states 70a and 70b, respectively, and the right eye image and the left eye image which are alternately displayed on the LCD panel 20 may be replaced with each other. That is, R and L in the drawing may be replaced with each other. Consequently, normal 3D images can be viewed even in the moire position in the opposite direction to that shown in FIG. 23.

The movement of the shading barrier 60 and the switching of display on the LCD panel 20 with respect to the movement of the head of the viewer 2 are as shown in Table 4 and Table 5. Table 4 shows a case where the viewer 2 is moved leftward in the drawing from the reference normal view position, where the head of the viewer 2 is moved from the reference normal view position in the Table 4 to a moire position (1), a reversed view position and a moire position (2). Table 5 shows a case where the viewer 2 is moved rightward in the drawing from the reference normal view position, where the head of the viewer 2 is moved from the reference normal view position in the Table 5 to a moire position (3), a reversed view position and a moire position (4).

The movement of the shading barrier 70 and the switching of display on the LCD panel 20 are performed with respect to the movement of the viewer 2 from a plurality of normal view positions which exist at the proper viewing distance in short-distance viewing, whereby a complete 3D image without glasses can be viewed from all positions at the proper viewing distance. The movement of the shading barrier 70 and the switching of display on the LCD panel 20 may be similarly performed with respect to the movement from the respective normal view positions.

According to the present embodiment, it is possible to enlarge the range in which 3D images are viewed with respect to the lateral movement at the time of short-distance viewing.

TABLE 4

| movement of viewer | leftward in drawing from normal view position | | | reference normal |
|---|---|---|---|---|
| 3D viewing state | moire position(2) | reversed view position | moire position(1) | view position |
| barrier a | ◯ | X | ◯ | X |
| barrier b | ◯ | ◯ | ◯ | ◯ |
| barrier c | X | ◯ | X | ◯ |
| image replacement | X | ◯ | ◯ | X |

TABLE 5

| movement of viewer | reference normal | rightward in drawing from normal view position | | |
|---|---|---|---|---|
| 3D viewing state | view position | moire position(3) | reversed view position | moire position(4) |
| barrier a | X | ◯ | X | ◯ |
| barrier b | ◯ | ◯ | ◯ | ◯ |
| barrier c | ◯ | X | ◯ | X |
| image replacement | X | X | ◯ | ◯ |

In Table 4 and Table 5, ◯ and x in the columns of the barriers a, b and c respectively indicate that they are on and off, and ◯ and x in the column of image replacement respectively indicate the replacement of a left eye image and a right eye image and the initial state. As compared with Table 2 and Table 3, the shading barrier on the light incidence side is the same in operations as the above-mentioned shading barrier on the light emission side except that the switching between on and off states in the barrier a and the barrier c is reversed.

According to the present embodiment, it is possible to enlarge the range in which 3D images are viewed with respect to the lateral movement at the time of short-distance viewing.

Although in the above-mentioned present embodiment, the barrier on the light emission side 60 and the barrier on the light incidence side 70 are respectively for long-distance viewing and short-distance viewing, the barrier on the light emission side 60 and the barrier on the light incidence side 70 can be respectively for short-distance viewing and long-distance viewing by reversing the distance between the shading barrier 60 and the LCD panel 20 and the distance between the shading barrier 70 and the LCD panel 20.

Furthermore, it is also possible to display normal 2D images which are not degraded upon bringing all the shading barriers 60 and 70 arranged ahead of and behind the LCD panel 20 into their off states.

As described in the foregoing, the first 3D display device according to the present invention laterally moves the position of the parallax barrier from the initial position when the head of the viewer is in a crosstalk position between the normal view position and the reversed view position. Therefore, the normal view position or the reversed view position can be moved to the crosstalk position occurring when the parallax barrier is fixed. Even if the head of the viewer is in the crosstalk position, the right eye image and the left eye image cannot be simultaneously viewed, whereby the right eye image and the left eye image can be replaced with each other without giving an uncomfortable feeling.

The second 3D display device according to the present invention can not only enlarge the range in which 3D images can be viewed in the longitudinal and lateral directions but also display normal 2D images which are not degraded.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A three-dimensional display device comprising:
   a liquid crystal display panel on which pixels for left eye images and pixels for right eye image are alternately displayed;

a display driving means for generating a left eye image signal and a right eye image signal for displaying a left eye image and a right eye image by the pixels for left eye images and the pixels for right eye image on said liquid crystal display panel;

a shading barrier having a slit and a barrier for producing a binocular parallax effect;

a sensor for sensing the position of the head of a viewer in a right and left direction;

position sensing control means for determining whether the head of the viewer is in a normal view position, a reversed view position or a position spaced approximately one-fourth to approximately three-fourths of the distance between the eyes of the viewer apart from the center of the normal view position by an output of said sensor; and barrier movement means for laterally moving the barrier of said shading barrier from the initial position when said position sensing control means senses that the head of the viewer is in the position spaced approximately one-fourth to approximately three-fourths of the distance between the eyes of the viewer apart from the center of the normal view position.

2. The three-dimensional display device according to claim 1, wherein said barrier movement means moves the barrier of said shading barrier by one-fourth of its pitch.

3. The three-dimensional display device according to claim 2, wherein shutters which are turned on and off are respectively provided in both ends in the lateral direction of the slit of said shading barrier, and said barrier movement means turns the shutters on and off, to laterally move the barrier.

4. The three-dimensional display device according to claim 3, wherein said shutter is composed of a liquid crystal shutter.

5. The three-dimensional display device according to claim 1, wherein said barrier movement means returns the position of the barrier of said shading barrier to its initial state when said position sensing control means senses that the head of the viewer is moved to the reversed view position, and said display driving means generates a left eye image signal and a right eye image signal for displaying a left eye image and a right eye image signal for displaying a left eye image and a right eye image obtained by replacing the pixels for left eye images and the pixels for right eye image on an initial screen of said liquid crystal display panel.

6. The three-dimensional display device according to claim 1, wherein said shading barrier is composed of a liquid crystal display panel, the barrier of the shading barrier being switched to its on and off states, and said display driving means switches display on said liquid crystal display panel between display of three-dimensional images and display of two-dimensional images.

7. The three-dimensional display device according to claim 1, wherein said barrier is arranged between a light source and the liquid crystal display panel.

8. The three-dimensional display device according to claim 7, wherein the barrier of said shading barrier is composed of a reflecting material, a light absorbing film being formed on a surface of the barrier on the side of the liquid crystal display panel.

9. The three-dimensional display device according to claim 7, wherein said barrier movement means moves said barrier in a direction opposite to the direction in which the head of the viewer is moved.

10. The three-dimensional display device according to claim 7, wherein said barrier movement means moves the barrier of said shading barrier toward either one of the left and the right from the initial position when the head of the viewer moves to the position spaced approximately one-fourth to approximately three-fourths of the distance between the eyes of the viewer apart from the center of the normal view point, and said display driving means continuously generates the left eye image signal and the right eye image signal without replacing the pixels for left eye images and the pixels for right eye image on said liquid crystal display panel when the direction in which the head of the viewer is moved and the direction in which the shading barrier is moved are opposite to each other, while generating a left eye image signal and a right eye image signal for displaying a left eye image and a right eye image obtained by replacing the pixels for left eye images and the pixels for right eye image on said liquid crystal display panel when the directions are the same.

11. The three-dimensional display device according to claim 1, wherein said shading barrier is arranged between the liquid crystal display panel and the viewer.

12. The three-dimensional display device according to claim 11, wherein said barrier movement means moves said barrier in the same direction as the direction in which the head of the viewer is moved when the head of the viewer moves to the position spaced approximately one-fourth to approximately three-fourths of the distance between the eyes of the viewer apart from the center of the normal view point.

13. The three-dimensional display device according to claim 11, wherein said barrier movement means moves the barrier of the shading barrier toward either one of the right and the left from the initial position when the head of the viewer moves to the position spaced approximately one-fourth to approximately three-fourths of the distance between the eyes of the viewer apart from the center of the normal view point; and said display driving means continuously generates the left eye image signal and the right eye image signal without replacing the pixels for left eye images and the pixels for right eye image on the liquid crystal display panel when the head of the viewer is moved in the one direction, while generating a left eye image signal and a right eye image signal for displaying a left eye image and a right eye image obtained by replacing the pixels for left eye images and the pixels for right eye image on the liquid crystal display panel when the head of the viewer is moved in the opposite direction.

14. A three-dimensional display device comprising:

a liquid crystal display panel on which pixels for left eye images and pixels for right eye image are displayed;

a display driving means for generating a left eye image signal and a right eye image signal for displaying a left eye image and a right eye image by the pixels for left eye images and the pixels for right eye image on said liquid crystal display panel;

a light source provided on the light incidence side of said liquid crystal display panel for emitting light in a plane shape;

a first shading barrier arranged between said light source and the liquid crystal display panel in which a barrier producing a binocular parallax effect is so constructed that it can selectively obstruct light from said light source;

a second shading barrier arranged on the light emission side of said liquid crystal display panel in which a barrier producing a binocular parallax effect is so constructed that it can selectively obstruct light from said liquid crystal display;

a sensor for sensing the position of the head of a viewer in a right and left direction and a back and forth direction;

position sensing control means for determining whether the head of the viewer is in a normal view position, a reversed view position or a position spaced approximately one-fourth to approximately three-fourths of the distance between the eyes of the viewer apart from the center of the normal view position by an output of said sensor; and barrier movement means for laterally moving the barrier of said first or second shading barrier from the initial position when the head of the viewer is in the position spaced approximately one-fourth to approximately three-fourths of the distance between the eyes of the viewer apart from the center of the normal view position by said position sensing control means.

15. The three-dimensional display device according to claim 14, wherein the distance between said liquid crystal display panel and the first shading barrier and the distance between said liquid crystal display panel and the second shading barrier differ from each other.

16. The three-dimensional display device according to claim 15, wherein said first and second shading barriers are composed of a TN (Twisted Nematic)-type liquid crystal display panel.

17. The three-dimensional display device according to claim 15, wherein the barrier movement means moves the barrier of said shading barrier by one-fourth of its pitch.

18. The three-dimensional display device according to claim 15, wherein said barrier movement means returns the position of the barrier of said shading barrier to its initial state when said position sensing control means senses that the head of the viewer is moved to the reversed view position, and said display driving means generates a left eye image signal and a right eye image signal for displaying a left eye image and a right eye image obtained by replacing the pixels for left eye images and the pixels for right eye image on an initial screen of said liquid crystal display panel.

19. The three-dimensional display device according to claim 15, wherein the barrier of said first or second shading barrier is switched on and off on the basis of information relating to the positions ahead of and behind the viewer by said position sensing control means such that when the barrier is on the barrier obstructs light from reaching the viewer, and when the barrier is off the barrier does not obstruct light from reaching the viewer.

20. The three-dimensional display device according to claim 15, wherein said display driving means switches the left type image signal and the right eye image signal in correspondence to the position of the head of the viewer with respect to information relating to positions on the right and left sides of the viewer by said position sensing control means, while switching the proper viewing distance of three-dimensional images by switching on and off the barrier of said first or second shading barrier with respect to information relating to the positions ahead of and behind the viewer such that when the barrier is on the barrier obstructs light from reaching the viewer, and when the barrier is off the barrier does not obstruct light from reaching the viewer.

21. The three-dimensional display device according to claim 15, wherein the direction in which the head of the viewer is moved and the direction in which the barrier is moved coincide with each other when the barrier of said second shading barrier is switched on and the barrier of said first shading barrier is switched off with respect to information corresponding to the position of the head of the viewer which is spaced approximately one-fourth to approximately three-fourths of the distance between the eyes of the viewer apart from the center of the normal view position by said position control sensing means.

22. The three-dimensional display device according to claim 15, wherein the direction in which the head of the viewer is moved and the direction in which the barrier is moved are opposite to each other when the barrier of said first shading barrier is switched on and the barrier of said second shading barrier is switched off with respect to information corresponding to the position of the head of the viewer which is spaced approximately one fourth to approximately three-fourths of the distance between the eyes of the viewer apart from the center of the normal view position by said position sensing control means.

23. The three-dimensional display device according to claim 15, wherein in a case where the direction in which said barrier is moved is one direction with respect to information corresponding to the position of the head of the viewer which is spaced approximately one-fourth to approximately three-fourths of the distance between the eyes of the viewer apart from the center of the normal view position, and the barrier of the second shading barrier obstructs light and the barrier of the first shading barrier does not obstruct light, said display driving means continuously generates the left eye image signal and the right eye image signal without replacing the pixels for left eye images and the pixels for right eye image on the liquid crystal display panel when the direction in which the head of the viewer is moved and the direction in which the barrier is moved are the same, while generating a left eye image signal and a right eye image signal for displaying a left eye image and a right eye image obtained by switching the pixels for left eye images and the pixels for right eye image on the liquid crystal display panel when the directions are opposite to each other.

24. The three-dimensional display device according to claim 15, wherein in a case where the direction in which said barrier is moved is one direction with respect to information corresponding to the position of the head of the viewer which is spaced approximately one-fourth to approximately three-fourths of the distance between the eyes of the viewer apart from the center of the normal view position, and the barrier of the first shading barrier obstructs light and the barrier of the second shading barrier does not obstruct light;

said display driving means continuously generates the left eye image signal and the right eye image signal without switching the pixels for left eye images and the pixels for right eye image on the liquid crystal display panel when the direction in which the head of the viewer is moved and the direction in which the barrier is moved are opposite to each other, while generating a left eye image signal and a right eye image signal for displaying a left eye image and a right eye image obtained by switching the pixels for left eye images and the pixels for right eye image on the liquid crystal display panel when the directions are same.

25. The three-dimensional display device according to claim 14, wherein the obstructing of light by the barrier of either one of said first and second shading barriers and the admitting of light by the barriers of both said first and second shading barriers are switched, to switch display of three-dimensional images and display of two-dimensional images.

* * * * *